(12) United States Patent
Tachibana et al.

(10) Patent No.: US 6,219,053 B1
(45) Date of Patent: Apr. 17, 2001

(54) ICON DISPLAY AND METHOD WHICH REFLECT THE INTUITIVE PERSPECTIVE OF CORRELATION BETWEEN ICONS WHICH HAVE HIERARCHICAL RELATIONSHIPS

(75) Inventors: Shoichi Tachibana; Kouji Ishibashi; Kazutaka Sasaki; Kenichi Shimazaki; Kazuaki Sasaki, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/106,899

(22) Filed: Jun. 30, 1998

(30) Foreign Application Priority Data

Feb. 9, 1998 (JP) .................................. 10-027631

(51) Int. Cl.[7] .................................. G06F 3/00; G06F 3/14
(52) U.S. Cl. .......................... 345/348; 345/339; 345/356; 345/440
(58) Field of Search ..................................... 345/334–335, 345/339, 348, 356, 431, 440, 968

(56) References Cited

U.S. PATENT DOCUMENTS

| 5,619,632 | * | 4/1997 | Lamping et al. | 345/356 X |
|---|---|---|---|---|
| 5,623,590 | * | 4/1997 | Becker et al. | 345/348 X |
| 5,751,965 | * | 5/1998 | Mayo et al. | 345/356 X |
| 5,802,383 | * | 9/1998 | Li et al. | 345/348 X |
| 5,821,937 | * | 10/1998 | Tonelli et al. | 345/356 |
| 5,870,768 | * | 2/1999 | Hekmatpour | 345/339 X |
| 5,958,008 | * | 9/1999 | Pogrebisky et al. | 709/223 |
| 5,966,128 | * | 10/1999 | Savage et al. | 345/356 |
| 6,067,093 | * | 5/2000 | Grau et al. | 345/440 |

FOREIGN PATENT DOCUMENTS

WO98/14906 * 4/1998 (JP) .................................. G06T/1/00

* cited by examiner

Primary Examiner—Raymond J. Bayerl
Assistant Examiner—X. L. Bautista
(74) Attorney, Agent, or Firm—Staas & Halsey LLP

(57) ABSTRACT

In monitoring a network in which nodes such as a host, a hub, rooter, etc. are interconnected, each node is indicated by an icon, and the connection between the nodes is indicated by a line. A node to be regarded is positioned in the center of the map as a root, and a node directly connected to the root is arranged as a node at the second hierarchical level on the circumference of the circle with the root centered. The node connected to the node at the second hierarchical level is arranged as a node at the third hierarchical level on the circumference of the concentric circle, with the root centered, having a larger radius than the node at the second hierarchical level. Similarly, the network configuration is assumed to be a hierarchical structure with the root centered, and an icon indicating an object at a higher hierarchical level is arranged on the circumference of a concentric circle having a larger radius.

42 Claims, 28 Drawing Sheets

θ, θ' : ACTUAL DISPLACEMENT ANGLE

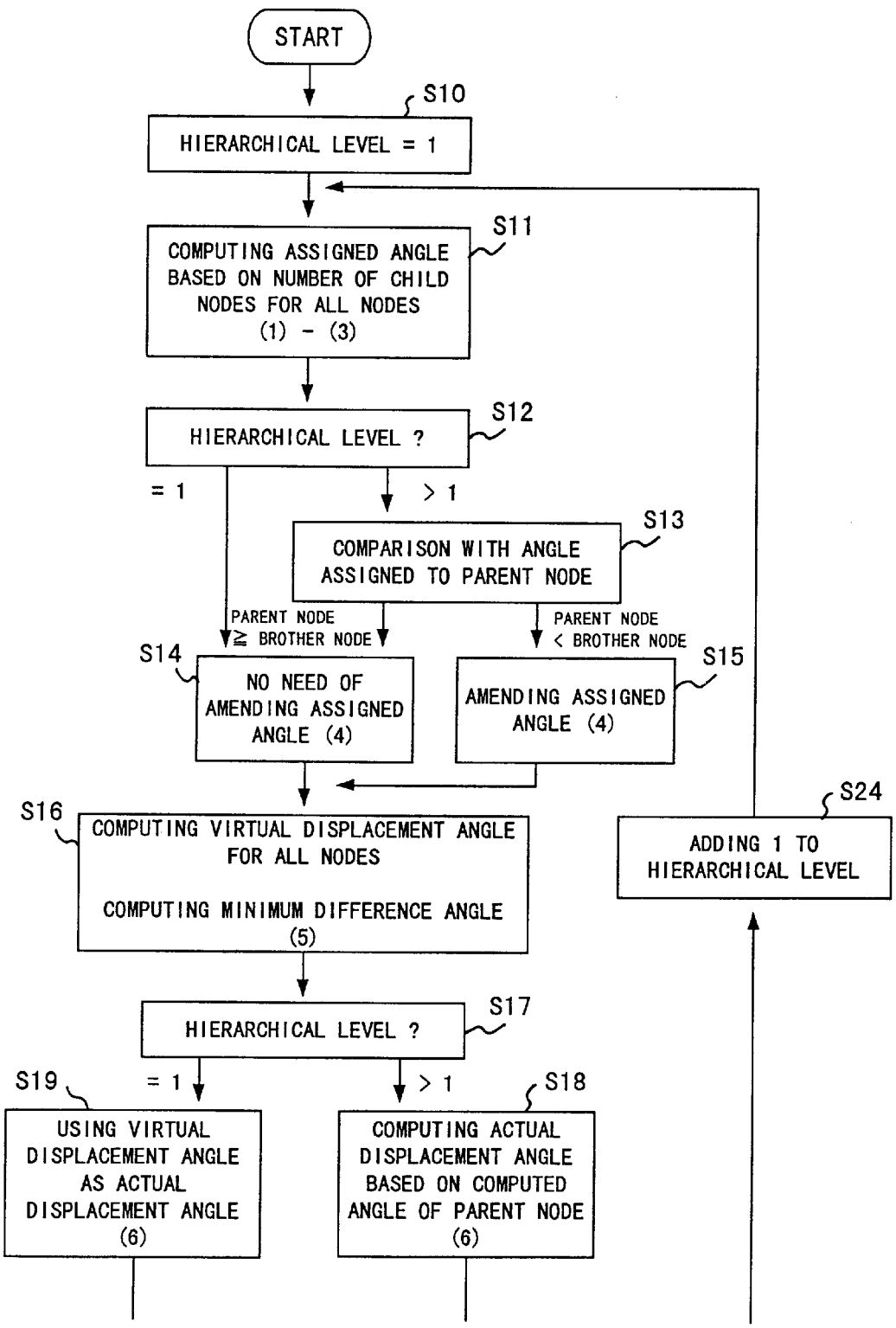
F I G. 1 0

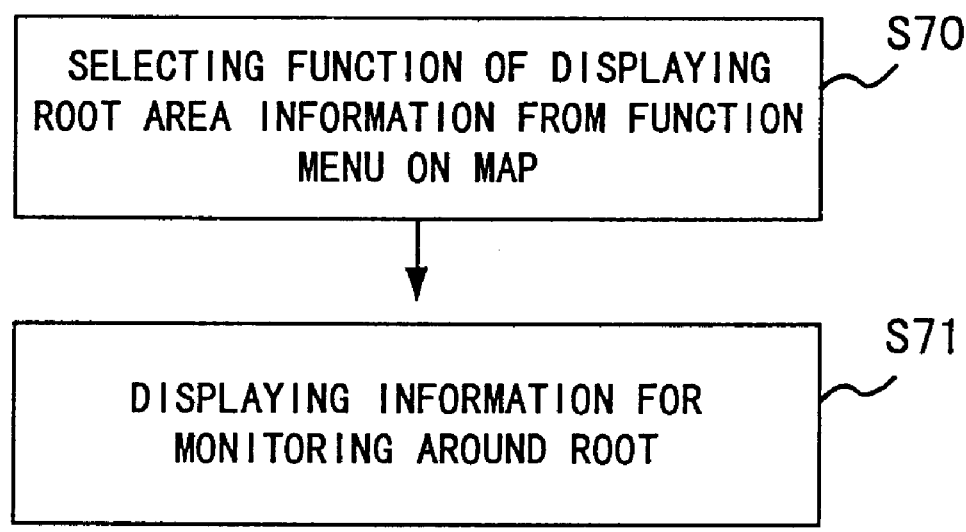
F I G. 2 3

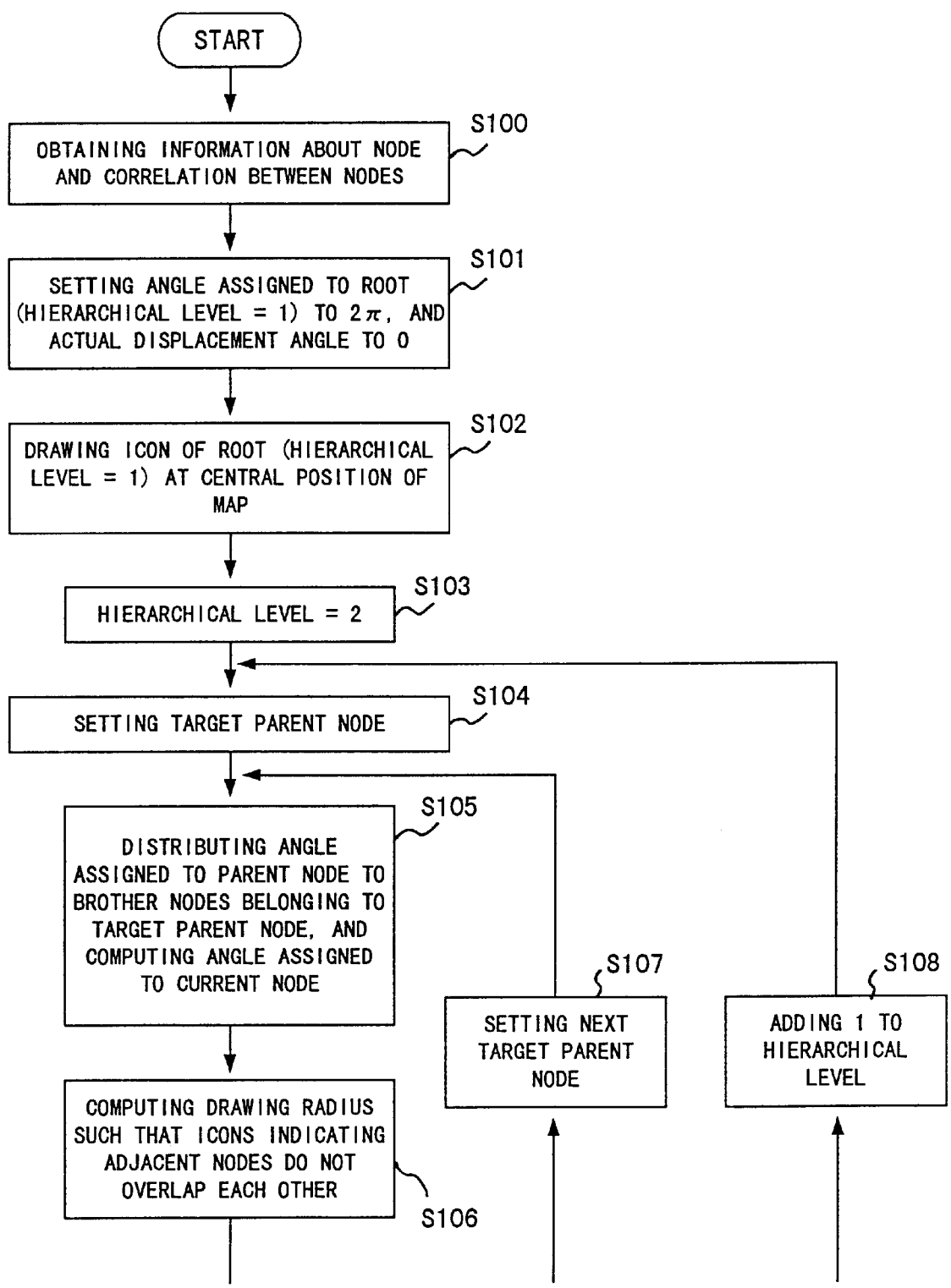
F I G. 25

ICON DISPLAY AND METHOD WHICH REFLECT THE INTUITIVE PERSPECTIVE OF CORRELATION BETWEEN ICONS WHICH HAVE HIERARCHICAL RELATIONSHIPS

BACKGROUND OF THE INVENTION

1. Field of the Invention

The present invention relates to a system for monitoring objects and the correlation between the objects on a map showing the correlation between objects.

2. Description of the Related Art

For example, in a system for monitoring a host, router, hub, etc. provided in a network, an object to be watched or monitored can be a node such as a host, a router, a hub, etc. In this case, when the correlation between a node (root) to be monitored and another node subordinate to the node is monitored, it is required that the correlation can be correctly obtained and information can be easily referred to. In a network monitor system, the information about a host to be monitored and the connection to another host must be easily referred to. To represent the connection between nodes, it is effective to graphically represent the correlation between nodes on a map. When a map is drawn, an appropriate method of drawing pictures is required to easily refer to necessary information in monitoring nodes.

Conventionally, a tree-structure map drawing method is used to represent the correlation between a root and subordinate nodes.

FIG. 1 shows a method of drawing a conventional tree-structure map.

In this method, the icon of the root is drawn as the top, and the icons of the subordinate nodes assigned the same hierarchical level of hierarchical position are arranged in the same line. Adjacent icons are connected via lines. Thus, the correlation between the root and the subordinate nodes can be represented by multiple hierarchical levels of a tree structure. In the following descriptions, a hierarchical level having a larger ordinal number is a higher hierarchical level, and the hierarchical level having a smaller ordinal number is a lower hierarchical level. Therefore, in FIG. 1, the first hierarchical level, or the root, is the lowest hierarchical level. The lower positions in FIG. 1 refer to higher hierarchical levels.

In the conventional method, the node indicating a root is assigned the top position. The number of nodes increases downward. Since the network configuration is represented based on the root, the representation cannot be flexibly changed. Furthermore, since the number of nodes displayed at the same hierarchical level increases at a higher hierarchical level, the number of displayed icons (corresponding to nodes) increases at a higher hierarchical level, thereby causing the problem that each icon cannot be easily recognized on the display screen.

The node of a root is the center of a network such as a host, etc. In the conventional tree structure, the displayed configuration of the network does not represent an actual network.

In the conventional method of drawing a tree-structure map, the map contains the icon indicating the root as the top regardless of the physical configuration of a target to be actually monitored. Therefore, when the user is going to monitor the target using the map, it is difficult to know the entire configuration of the target to be monitored or to intuitively monitor a specific target, thereby failing to efficiently monitor a target.

SUMMARY OF THE INVENTION

The present invention aims at providing a method of displaying an icon so that the configuration of the entire monitored target and a specified node can be grasped and monitored intuitively and efficiently.

The icon display method according to the present invention includes a step of drawing an icon indicating an object to be regarded; a step of drawing icons having an equivalent correlation with an object to be regarded at an equal distance from the object to be regarded; and a step of connecting icons indicating adjacent objects using a line. With the configuration, the correlations between the object to be regarded and the objects related to the object to be regarded are drawn on concentric circles.

Another aspect of the icon display method according to the present invention includes a step of drawing an icon indicating an object to be regarded; a step of drawing icons having the closest correlation with the drawn object at an equal distance from the drawn object. With the configuration, the correlation between objects is represented by connecting icons indicating adjacent objects using a line.

The icon display apparatus according to the present invention draws an icon corresponding to an object with the correlation with other objects taken into account, and includes a computation unit for determining the position of an icon indicating an object to be regarded, and computing the positions of the icons having an equivalent correlation with an object to be regarded at an equal distance from the object to be regarded as the positions of drawing the icons indicating the objects having relationships with the object to be regarded; and a drawing unit for drawing an icon indicating an object to be regarded, drawing an icon indicating an object having correlation with the object to be regarded at the position computed by the computation unit, and connecting icons indicating adjacent objects using a line. With the configuration, the correlations between the object to be regarded and the objects related to the object to be regarded are drawn on the concentric circles.

A further aspect of the icon display apparatus according to the present invention draws an icon corresponding to an object with the correlation between objects taken into account, and includes a computation unit for determining the drawing position of an icon indicating an object to be regarded, and computing the positions of the icons indicating the objects having the closest correlations with the icon indicating the object whose drawing position is determined at an equal distance from the drawn icon indicating the object as the drawing positions of the icons indicating the objects having the closest correlations with the object whose drawing position is determined; and a drawing unit for drawing icons indicating the object to be regarded and other objects based on the process result of the computation result, and connecting the icons indicating the adjacent objects using a line. With the configuration, the correlations between objects can be drawn.

According to the present invention, icons indicating objects are arranged on concentric circles or on circles having respective objects in the center based on the icon indicating the object to be regarded.

Therefore, the closeness in correlation with the icon indicating the object to be regarded can be recognized at a glance. Furthermore, the complicated correlation in the network of objects can be clearly indicated by representing the correlations between icons indicating respective objects as connected using lines. Additionally, the correlation between objects can be re-recognized from various points of views by changing an object to be regarded, thereby easily obtaining the correlations between objects and the information about objects themselves.

BRIEF DESCRIPTION OF THE DRAWINGS

FIG. 10 is a flowchart (1) showing the process of realizing the method describing by referring to FIGS. 7A through 9;

FIG. 23 is a flowchart showing the process of realizing the function shown in FIG. 22;

FIG. 25 is a flowchart (1) showing the process of displaying the map shown in FIG. 24;

DESCRIPTION OF THE PREFERRED EMBODIMENTS

Figure 1:
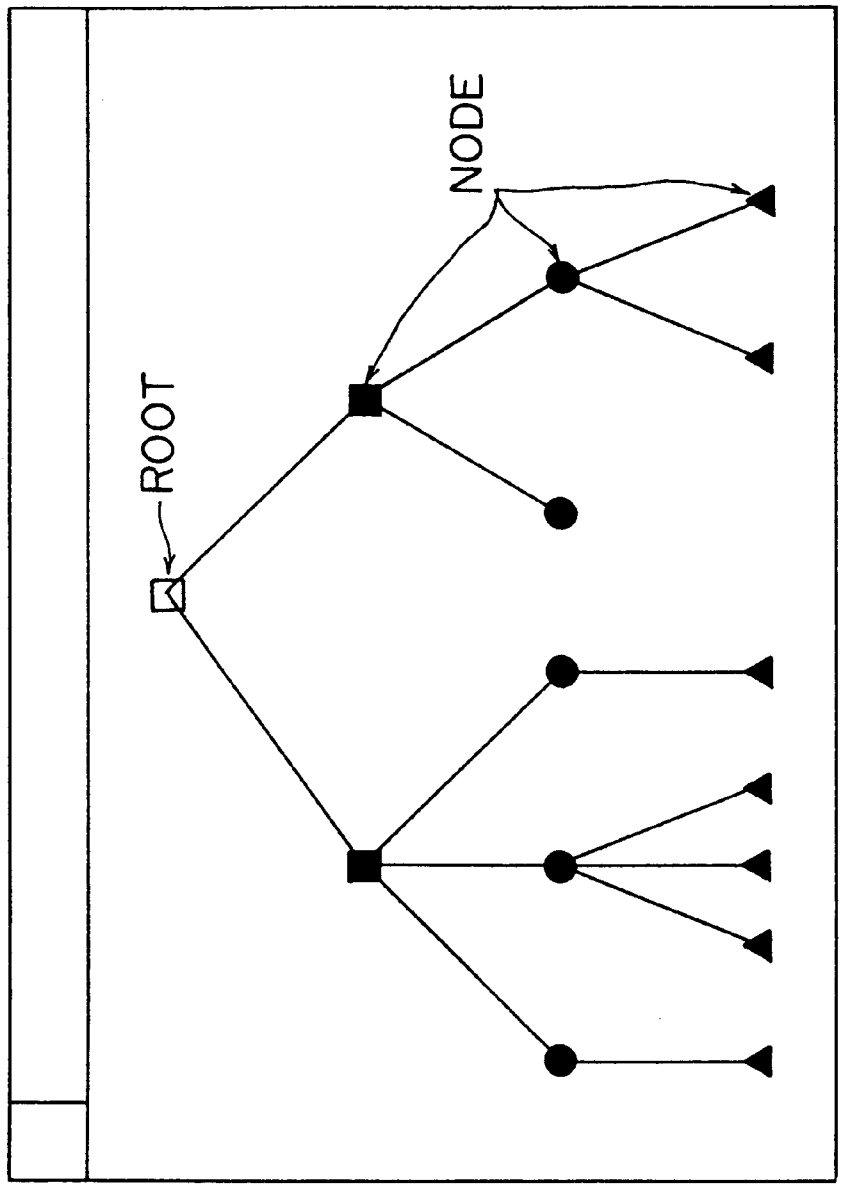
FIG. 1 shows a method of drawing a conventional tree structure map.
Figure 2:
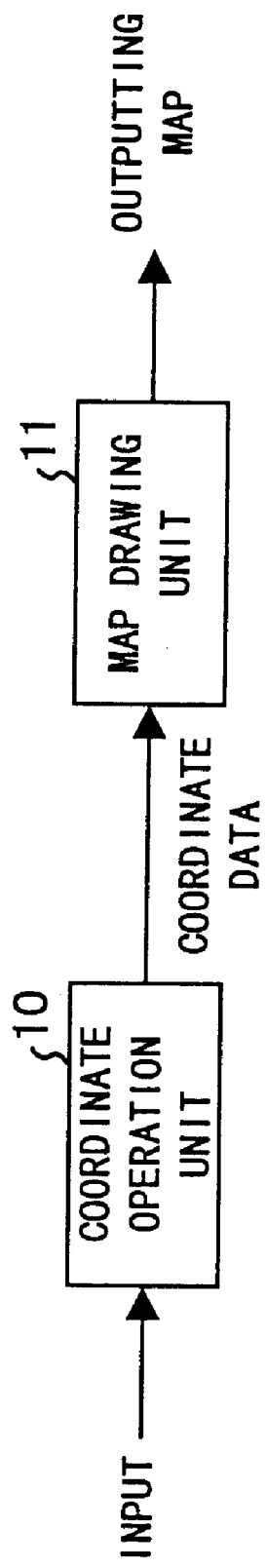
FIG. 2 shows the configuration of the apparatus for realizing the map drawing method according to the present invention.

FIG. 2 shows the configuration of the device for realizing the method of drawing a map according to the present invention.

The input data to the device according to the present invention refers to information about each node and data representing the relationship between nodes. The information regarding each node refers to, for example, the name or attribute of a node, the data representing the relationship between the nodes refers to information about the master-slave relationship between nodes, which node should be a root, etc.

When the above described information is input, a coordinate operation unit 10 first determines the position of a node to be defined as a root, and then sequentially computes the display positions from the root node based on the master-slave relationship between nodes. Then, it associates each node with the information about each node. When the operation is finished, the coordinate operation unit 10 transmits to a map drawing unit 11 the coordinates for defining the position of an icon indicating a node obtained as a result of the operation together with the above described information.

The coordinate data of each node refers to the drawing angle, the drawing radius, etc. of an icon indicating each node. The drawing radius refers to the distance in the radial direction from the position of the icon indicating the root. The drawing angle refers to the angle from the reference line determined when an icon is actually drawn on the map.

The map drawing unit 11 displays each icon based on the coordinates of each icon input from the coordinate operation unit 10. At this time, an instruction can also be issued to determine the pattern of each icon. If the user issues the instruction, it is input with other data when the data is preliminarily input to the coordinate operation unit 10.

The map drawing unit 11 draws each icon, and associates each icon with the information about a node corresponding to each icon. Thus, more detailed data can be obtained about a node corresponding to an icon displayed by the map drawing unit 11 and pointed to by a pointer when the user clicks the mouse button. Therefore, when the present invention is applied to the network monitor device, detailed information can be provided for a network supervisor. The map drawing unit 11 can display further information other than an icon corresponding to a node on the map as connected to another icon. For example, when the network monitor device is used, the line connecting each icon corresponds to the transmission line of a network. Therefore, each line can be displayed with the amount of traffic so that the network supervisor can understand at one glance how much traffic is detected at which part of the network. However, since the entire display is too complicated if the amount of traffic is displayed for all lines forming the network, only the node to be regarded, that is, only the area around the root, may be displayed for easy view of the map.

Thus, the map generated by the map drawing unit 11 is output to the display device, etc. not shown in FIG. 2, and presented to the user operating the system using a map such as a network supervisor, etc.

Figure 3:
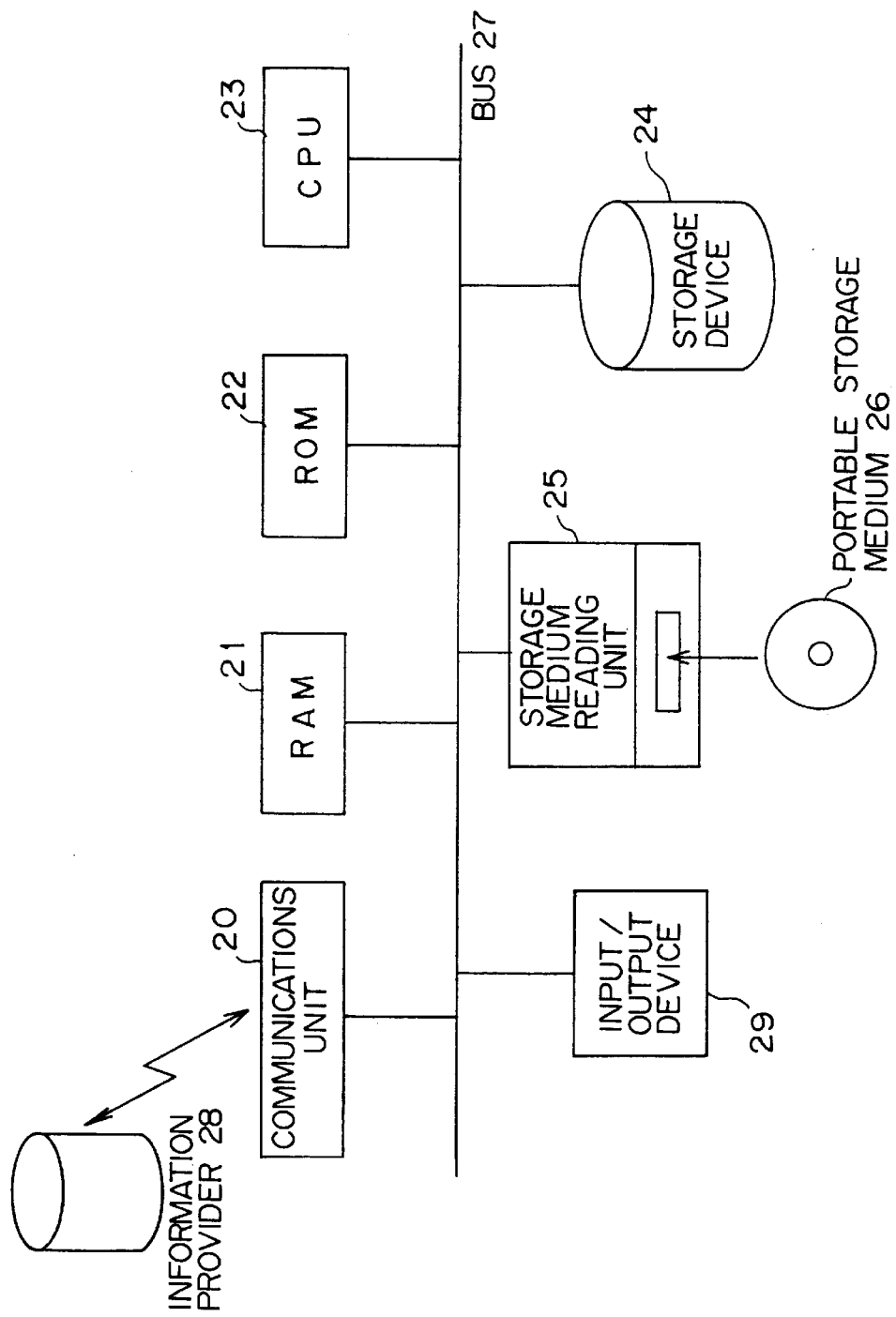
FIG. 3 shows the hardware environment of the apparatus for realizing the method according to the present invention.

FIG. 3 shows the hardware environment of the device for realizing the method according to the present invention.

The method according to the present invention can be applied as software to a personal computer, etc. In this case, the hardware to be provided for the personal computer, etc. can be, as shown in FIG. 3, a CPU 23, a ROM 22, a RAM 21, a communications unit 20, a storage device 24, a storage medium reading unit 25, an input/output device 29, etc. connected through a bus 27. The communications unit 20 is not always necessary, but can realize variations of the method according to the present invention when the method is used as a software program.

The CPU 23 processes data based on the program for executing the method according to the present invention. This program is stored in the RAM 21, etc. after being developed in a format readable by the CPU 23. The ROM 22 stores the BIOS, etc. first read by the CPU 23 to input data from the input/output device 29 and output data to the input/output device 29 when the device shown in FIG. 3 is activated. It is obvious that the program can be stored in the ROM 22 when the device shown in FIG. 3 is designed exclusively for the method according to the present invention.

The RAM 21 stores the program as described above so that the CPU 23 can read and execute the program, and functions as work memory. The program is stored in the storage device 24 including a hard disk, etc., and developed with the CPU 23 in the RAM 21 at a user instruction from the input/output device 29. The program is executed with the CPU 23 developed in the RAM 21. The input/output device 29 comprises a display, a keyboard, a mouse, etc., issues to the CPU 23 an instruction from a user who uses the device shown in FIG. 3, and displays the operation result of the CPU 23 in such a way that the user can easily understand the result.

The program for realizing the method according to the present invention is not only stored in the storage device 24 for use, but also developed in the RAM 21 for use after storing it in the portable storage medium 26 such as CD-ROM, a floppy disk, etc. and reading it by the storage medium reading unit 25. In this case, since the program is stored in a portable storage medium 26, it can be distributed to a number of users, and can allow the method of the present invention to be easily used in a computer by installing the program in a general purpose personal computer, etc. having the hardware environment as shown in FIG. 3.

With the growing popularity of computer communications of these days, a program for realizing the method according to the present invention can be downloaded through a network so that the program can be executed by the user's personal computer, etc. That is, it is possible for a computer to be connected to a commercial network, Internet, etc. through the communications unit 20, to download a program for realizing the method according to the present invention from the database of an information provider 28 who provides the program through a network, and to develop it in the RAM 21. The program can also be used through a network without being preliminarily downloaded from the information provider 28. That is, it is possible to use a program as if it were executed in the user's own computer by executing the program of the information provider 28 and exchanging data such as an operation result, etc. with the information provider 28 through the communications unit 20 with the user's computer being connected to the network through the communications unit 20. In this case, the data exchanged with the information provider 28 is provided for the user or input from the user through the input/output device 29. Furthermore, the data received as necessary through the communications unit 20 can be temporarily stored in the RAM 21 or the storage device 24 before presenting it from the input/output device 29 to the user, or the data input from the input/output device 29 can be temporarily stored in the RAM 21 or the storage device 24 before transmitting it to the information provider 28 through the communications unit 20.

Figure 4:
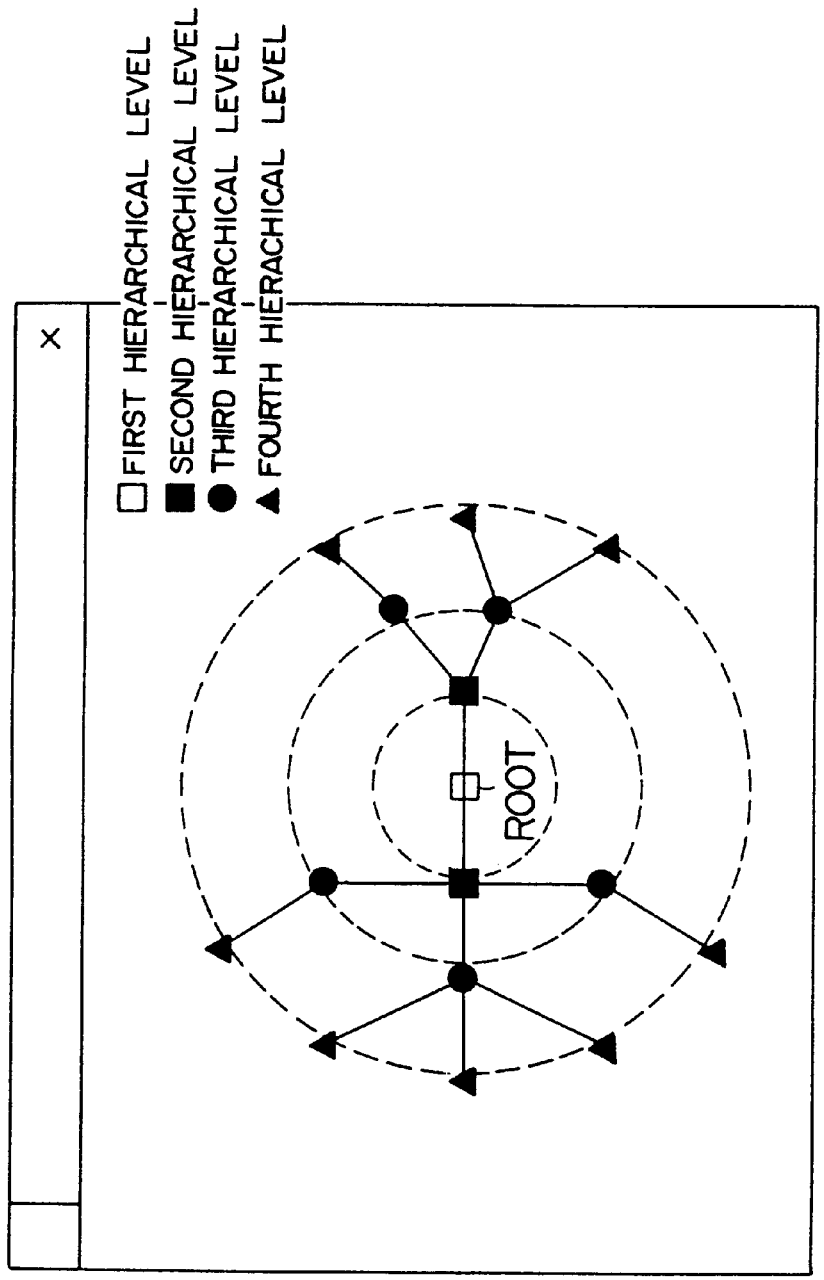
FIG. 4 shows an embodiment of the map displaying method according to the present invention.

FIG. 4 shows an embodiment of the method of displaying the map according to the present invention.

According to the present embodiment, as shown in FIG. 4, a map can be prepared by arranging icons indicating nodes belonging to respective hierarchical levels on concentric circles with the icon indicating the root positioned in the center. The icons indicating nodes having the same hierarchical correlation level are positioned at the same distance from the root node (the node to be regarded and monitored in the network monitor device).

For example, in FIG. 4, a different form of icon is used at each hierarchical level. First, the icon indicating the root of the first hierarchical level is a currently regarded node, and is positioned in the center and indicated as a white square. Two nodes are indicated as black squares at the second hierarchical level and connected to the root. The two nodes at the second hierarchical level are indicated by the same icon, and are positions on the concentric circle closest to the root. Therefore, the user can recognize at a glance that the number of nodes closest to the root is two. Next, three and two nodes are connected as the nodes at the third hierarchical level from the root to each node at the second hierarchical level. The nodes at the third hierarchical level are indicated by black circles in FIG. 4. The nodes at the third hierarchical level are arranged on the second concentric circle from the root, and the user can recognize at a glance that they are the second closest nodes from the root. Five nodes at the third hierarchical level are arranged on the second closest concentric circle from the root. Furthermore, a node at one hierarchical level farthest from the root is indicted by a black triangle, and is arranged on the third concentric circle from the root. The eight nodes at the fourth hierarchical level are the farthest nodes from the root in FIG. 4.

Thus, according to the present embodiment, the configuration of the network having a node to be regarded (root) in the center can be easily grasped by arranging a node reached through a larger number of nodes at the hierarchical level on the concentric circle farther from the node to be regarded.

In FIG. 4, the nodes belonging to the same hierarchical level are indicated by the same type of icon. However, they do not have to be so indicated but can be indicated by user-specified icons as described later.

In the above described display method, icons can be displayed at equal density, thereby improving the problem that the density of icons at a specific hierarchical level may be extremely high and makes it hard to easily grasp the entire network configuration. That is, assuming that the length of one side of the display screen is 2R, all icons belonging to the largest hierarchical level (highest hierarchical level) have to be arranged on the line having the length of 2R according to the conventional method. However, assuming that the radius of the outermost concentric circle is R, the icons belonging to the highest hierarchical level can be arranged on the circumference of 2πR according to the display method of the present invention. Therefore, the density of the icons on the circumference can be lower, and the user can easily grasp the entire network configuration on the display screen. Furthermore, since the number of nodes at the lower hierarchical level (hierarchical level having a smaller ordinal number of hierarchical level) is small, the density of icons corresponding to nodes is not too high even if the icons are arranged on the circumference of a small concentric circle close to the root. Thus, the display method according to the present invention can realize an even arrangement on the display screen.

Figure 5A:
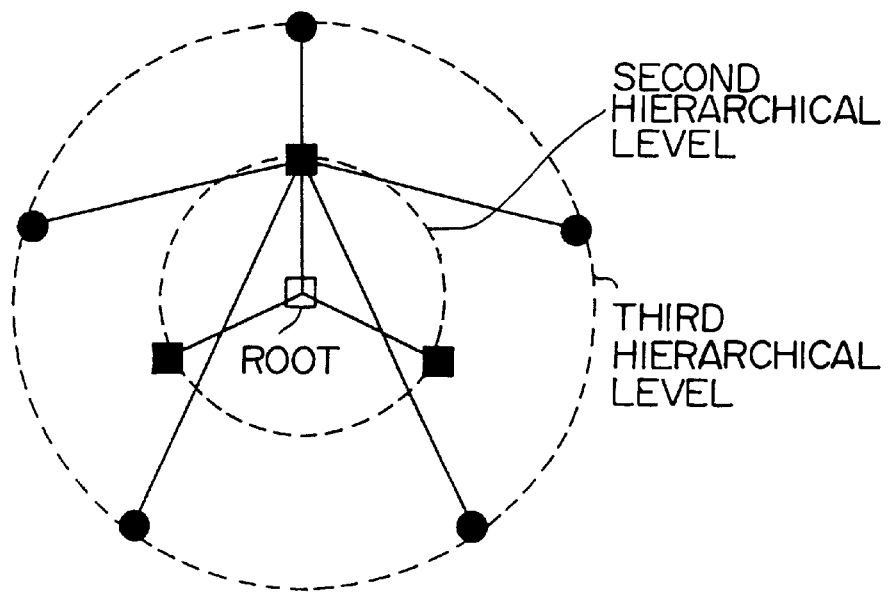
FIGS. 5A and 5B show the method of arranging icons on concentric circles in an example shown in FIG. 4.
Figure 5B:
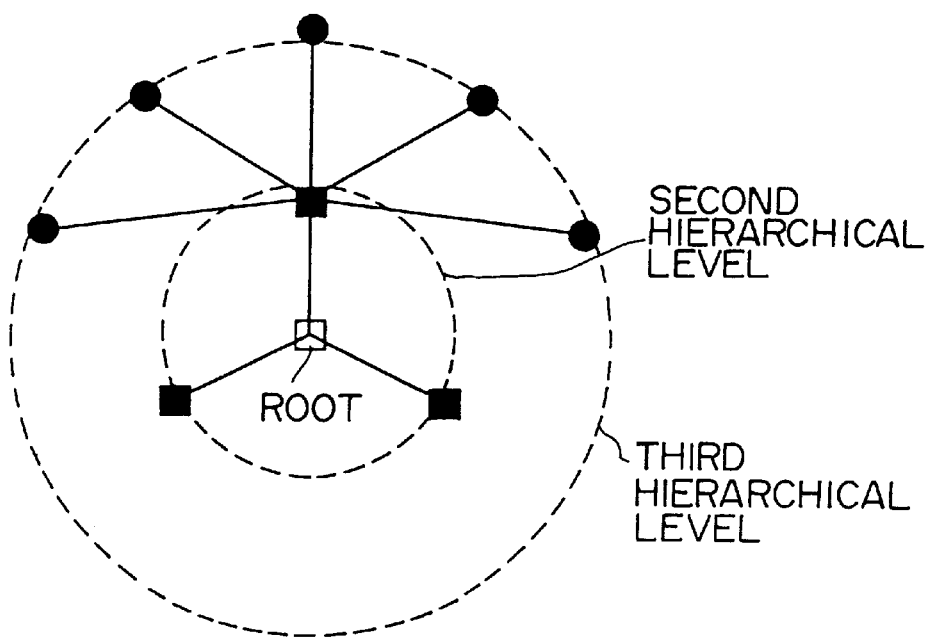

FIGS. 5A and 5B show the method of arranging the icons on concentric circles in a display example shown in FIG. 4.

In the method of drawing a map according to the present embodiment, the position of each icon is automatically determined on the map in such a way that icons and lines connecting the icons may not overlap each other.

In FIG. 5A, three nodes directly connected to the root are arranged at the second hierarchical level evenly on a concentric circle. When the icons indicating the nodes at the second hierarchical level directly connected to the root are arranged on a concentric circle, the circumference can be evenly divided corresponding to the number of nodes at the second hierarchical level directly connected to the root without problems when corresponding icons are arranged on the circumference.

Next, assume that five nodes are connected at third hierarchical level to one of the nodes at the second hierarchical level. In this case, as at the second hierarchical level, the icons at the third hierarchical level are evenly arranged on the circumference of the concentric circle evenly divided by the number of icons indicating the nodes. At this time, the icons indicating the nodes at the third hierarchical level connected to one node at the second hierarchical level are evenly arranged at the third hierarchical level on a concentric circle. Therefore, as shown in FIG. 5A, the lines connecting the nodes cross each other, thereby making it hard to view the entire map. When a network configuration is simple as shown in FIG. 5A, the configuration of the network can be grasped. However, if the network configuration is more complicated, then the lines connecting the icons cross each other in a complicated pattern, thereby making it difficult to grasp the configuration of the network.

Thus, as shown in FIG. 5B, when an icon indicating a node at the third hierarchical level connected to the icon indicating one node at the second hierarchical level is displayed, the range of the concentric circle of the third hierarchical level is limited as shown in FIG. 5B. Then, the lines connecting the icons at the third hierarchical level to the icons at the second hierarchical level do not cross the lines connecting the root to the icons at the second hierarchical level as shown in FIG. 5B., thereby allowing the map to be grasped without difficulty.

Figure 6:
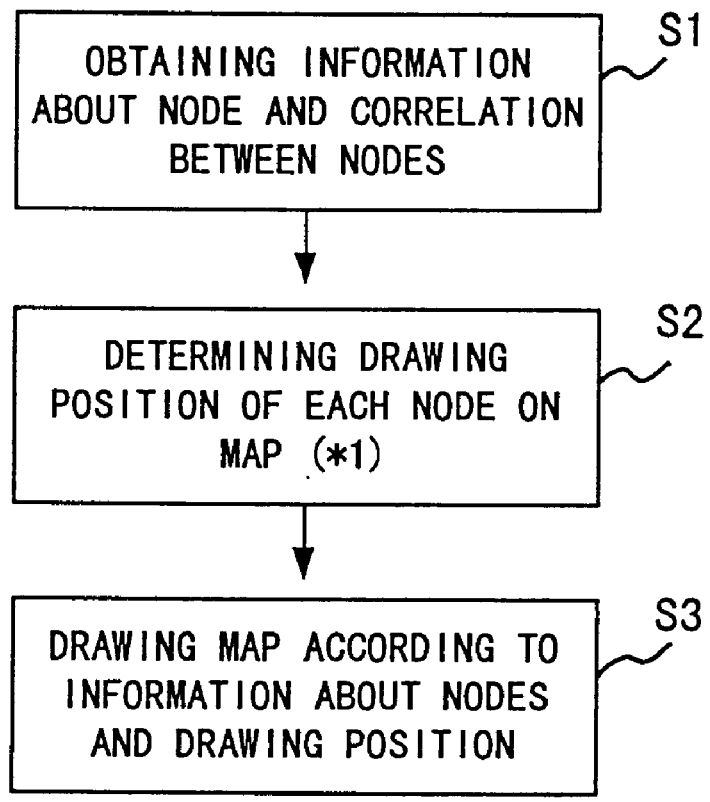
FIG. 6 is a flowchart showing the process of drawing a map according to the embodiment shown in FIG. 4.

FIG. 6 is a flowchart showing the process of drawing a map according to the embodiment shown in FIG. 4.

Figure 11:
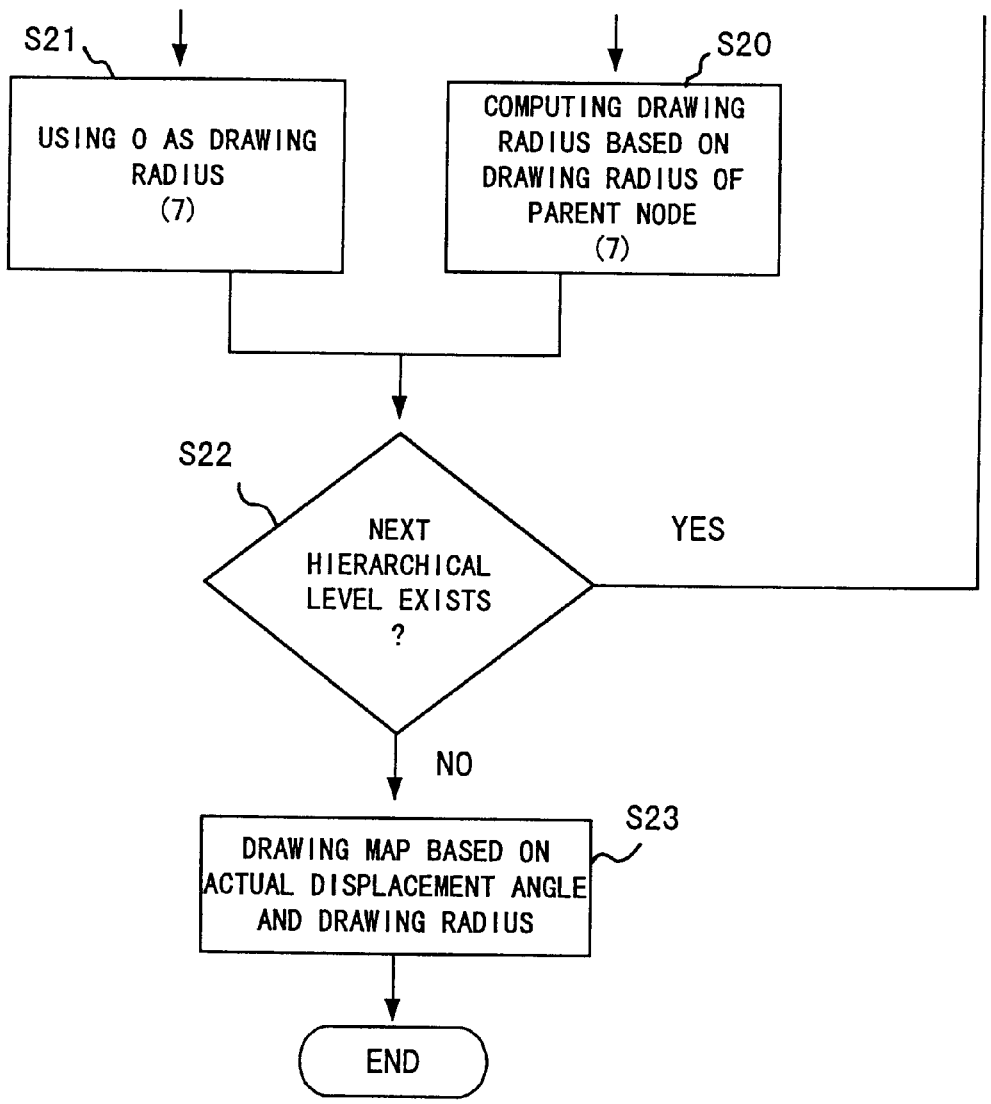
FIG. 11 is a flowchart (2) showing the process of realizing the method describing by referring to FIGS. 7A through 9.

First, in step S1, information about nodes and the correlation between nodes are obtained. Then, in step S2, the drawing position of an icon indicating each node is determined on the map. The method of determining the drawing position is described later in detail. Actually, in step S2, the processes shown in FIGS. 10 and 11 are performed. When the drawing position of an icon indicating each node is determined in step S2, a map is drawn in step S3 according to the information about each node drawn on the map and the drawing position obtained in step S2.

As described above, when a map is drawn, an icon indicating each node is displayed, and the amount of network traffic is displayed. Furthermore, icons can be displayed in various formats at a request from a user to appropriately display the information about nodes. For example, the amount of traffic can be displayed by clicking the mouse button with the line on the map pointed to by a pointer. Thus, the name of a node corresponding to each icon can be displayed. In this method, the user can recognize the name of the node indicated by the corresponding icon on the map, and can also recognize the position of a node when the user has the knowledge about an actual network. Therefore, the relationships between the root and the nodes drawn on the map can be replaced with the relationships between nodes in the actual network. Otherwise, only the icons corresponding to respective nodes and the lines connecting the icons are drawn on the map so that the information, etc. about the nodes can be output when the mouse button is clicked with each icon pointed to by the pointer. In this case, the map can be simple and can be easily grasped.

In any case, in step S3, icons indicating nodes and lines connecting the icons are drawn with the icons and lines associated with respective information so that the information can be appropriately referred to in the map when necessary.

FIGS. 7A through 9 show the method of determining the drawing position of each icon according to the embodiment of the present invention shown in FIG. 4.

As shown in FIGS. 5A and 5B, computations should be performed such that icons and lines connecting the icons may not overlap each other when the position of each icon is computed to draw a map. In this case, examples of computing the embodiment shown in FIG. 4 are illustrated.

In these examples, the distance from the center and the displacement angle from the reference axis which extends from the center are used as factors in determining the drawing position of each icon.

First, the displacement angle from the reference axis (hereinafter referred to as an actual displacement angle) is computed as follows.

Each icon indicating a node is assigned a drawing angle (hereinafter referred to as an assigned angle) by the following computation methods 1 through 4. The assigned angle is assigned in proportion to the number of sub-nodes belonging to the current nodes. In the subsequent computation method, the hierarchical level to which the root belongs is the first hierarchical level, and the hierarchical levels to which the subordinate nodes belong are sequentially the second hierarchical level, the third hierarchical level, and so forth.

1. First, the number of nodes (child nodes) subordinate to the root or the node (hereinafter referred to as a current node) to be computed is counted. When no child nodes exist, it is assumed that a virtual child node exists, and the number of child nodes is 1. For example, in FIG. 7A, three child nodes are connected to the current node, and the count value is 3.

2. Next, the total number of child nodes in all nodes belonging to the same hierarchical level as the current node is counted. When the current node to be computed in process 1 above is a node at the second hierarchical level, one node at the second hierarchical level has three child nodes while the other node has two child nodes as shown in FIG. 4 (although not shown in FIGS. 7A and 7B). Therefore, the total number of the child nodes at the second hierarchical level is 5.

Figure 7A:
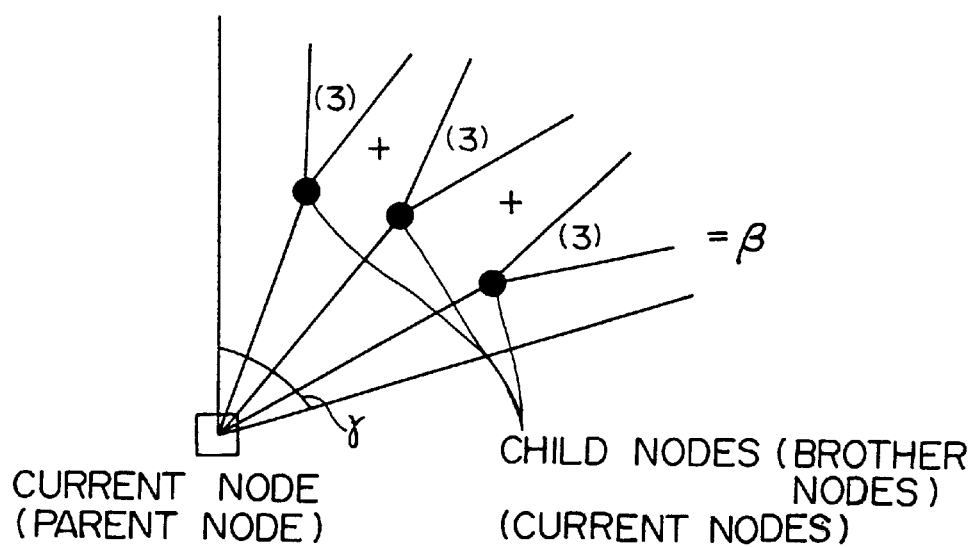
FIGS. 7A and 7B show the method (1) of determining the drawing position of each icon according to the embodiment shown in FIG. 4.
Figure 7B:
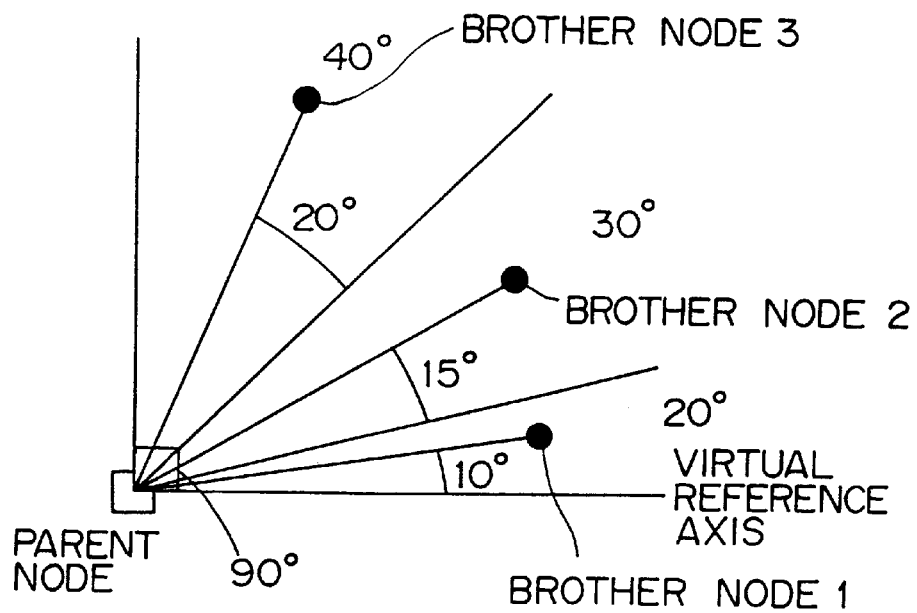

3. The assigned angle (units: radians) to the icon of the current node is computed by the following equation.

$$\gamma = \alpha/(\text{value obtained in process 2}) \times (\text{value obtained in process 1})$$

where $\gamma$ indicates an assigned angle to an icon of the current node. As shown in FIGS. 7A and 7B, $\gamma$ indicates the range of the angle within which the child nodes subordinate to the current node should be positioned. In FIG. 7A, $\gamma$ is shown as an angle based on the current node. However, it is an angle based on the root. Therefore, if the current node is the root, $\gamma$ is defined as shown in FIG. 7A. If it is not the root, the range of the angle is based on the root including the current node. The equation actually means to assign an angle to the current node in proportion to the ratio of the number of child nodes belonging to the current node to the number of child nodes in all nodes at the same hierarchical level as the current hierarchical level.

To prevent the icons and the lines connecting the icons from overlapping each other, the total value of the assigned angles is limited. As an example, $\alpha$ in the above described equation has the following value depending on the hierarchical level to which the current node belongs.

First hierarchical level: $2\pi$

Second hierarchical level: $1.5\pi$

Third hierarchical level: $\pi$

Fourth hierarchical level: $0.5\pi$

However, the value of $\alpha$ is only an example, and should be appropriately determined by the user of the present embodiment so that the map can be easily grasped. At this time, the value of $\alpha$ is set such that the icons and the lines connecting the icons do not overlap each other. Therefore, $\alpha$ may necessarily be variable depending on the configuration of the network. As a result, $\alpha$ can be variable depending on the configuration of the network to be monitored.

4. The assigned angle obtained in process 3 is amended to avoid the crossing of lines between those connecting a node (parent node) with its child nodes and those connecting another parent node with its child nodes. The amendment is made such that all child nodes can be arranged within the angle assigned to their parent node (all nodes subordinate to the same parent node are hereinafter referred to as brother nodes).

For example, by referring to FIG. 7A, the current node shown in FIG. 7A is referred to as a parent node, and one of its child nodes is referred to as a current node. Assume that some child nodes are connected to the current node. In process 3 above, each current node is assigned an angle. However, the parent node at the lower hierarchical level has already been assigned the angle of $\gamma$. Therefore, all icons indicating the current nodes belonging to the parent node, the child nodes, and further higher-order nodes should be arranged within the assigned angle of the parent node. Otherwise, the icons indicating the child nodes (the second higher order nodes from the parent nodes) belonging to different parent nodes can overlap each other.

Consequently, the assigned angle to each icon has to satisfy the following expression.

(angle assigned to icon of parent node) ≧ (total angles assigned to all brother nodes=A)

The expression is set such that, as shown in FIG. 7A, the total $\beta$ of the angles assigned to the brother nodes ((3) in FIG. 7A) can be smaller than the angle of $\gamma$ assigned to the parent node. Thus, the nodes belonging to the brother nodes can be arranged in the range (3) within the angle of $\gamma$ assigned to the parent node.

When the above described expression is satisfied, the value assigned to one of the brother nodes in process 3 is assigned as an assigned angle to the icon indicating the current node. When the above described expression is not satisfied, the angle assigned to the icon indicating the current node is amended by the following equation.

$$\gamma(\text{current node}) = (\text{value obtained in process 3})/\beta \times \gamma(\text{parent node})$$

$\beta$ = total of angles assigned to icons indicating brother nodes $\gamma$(parent node) = angle assigned to icon indicating parent node where 'value obtained in process 3' refers to the angle assigned to the brother nodes (described as the current nodes in the description of process 3), that is, the value of $\gamma$ initially assigned to the current node. Thus, if it is determined that the above described expression is not satisfied after the value $\gamma$ of the current node is temporarily assigned in process 3, then the value $\gamma$ of the current node is amended by the value $\gamma$ of the parent node. Amending by the value $\gamma$ of the parent node means that the value $\gamma$ of the parent node is divided in proportion to the ratio of the value $\gamma$ assigned to the current node to the total value $\beta$ of the angles assigned to the icons indicating the brother nodes, and then the value $\gamma$ is newly assigned to the current node.

However, since the root at the first hierarchical level has no parent nodes, the value obtained in process 3 is assigned as the value assigned to the current node.

Next, a virtual displacement angle (units: radians) is computed for the icon indicating each node by the following computation method in process 5. A virtual displacement angle refers to a displacement angle from a virtual reference axis which is one end based on which an icon indicating a parent node is assigned.

5. The virtual displacement angle is computed by the following equation.

$$(\text{Virtual displacement angle}) = \delta + (\text{value obtained in process 4})/2$$

$\delta$ = total angles assigned to icons indicating brother nodes for which the virtual displacement angle has already been computed by the above described expression:

where the 'value obtained in process 4' refers to the angle assigned to the current node, and satisfies the expression in process 4, that is, the angle assigned in process 3 or the assigned angle amended in process 4.

FIG. 7B shows the process performed in process 5. In FIG. 7B, each of brother nodes 1 through 3 belonging to a parent node is sequentially processed as a current node. The brother node 1 has an assigned angle of 20°. The brother node 2 has an assigned angle of 30°. the brother node 3 has an assigned angle of 40°. In this example, the units of an assigned angle are '°', for convenience in explanation. However, the units 'radians' should be adopted for convenience in later computation.

When a virtual displacement angle is obtained with the brother node 1 defined as the current node, the nodes belonging to the parent node have not been processed for a virtual displacement angle. As a result, $\delta$ equals 0. Then, the value obtained in process 4, that is, the angle assigned to the current node is 20°. Therefore, the virtual displacement angle is 10°. Thus, an assigned angle is divided by 2 to position the current node in the center within the angle assigned to the current node.

Next, when a virtual displacement angle is obtained with the brother node 2 defined as the current node, the brother node 1 has already been processed, thereby δ=20°. Consequently, the value of 35° is obtained as the virtual displacement angle of the brother node 2 by adding to the above described value (δ=20°) the half of the assigned angle of 30° of the brother node 2. That is, the brother node 2 is positioned at 35° from the virtual reference axis.

Furthermore, when a virtual displacement angle is obtained with the brother node 3 defined as the current node, δ=50° because the brother nodes 1 and 2 have already been processed. The virtual displacement angle of the brother node 3 is obtained by adding the half of the assigned angle of 40° of the brother node 3 to the above described value (δ=50°). In this example, the virtual displacement angle of the brother node 3 is 70°.

Thus, virtual displacement angles are determined for respective brother nodes belonging to the parent node.

The minimum value of the differences between the virtual displacement angles of adjacent brother nodes is stored as the minimum difference angle.

Based on the results, an actual displacement angle (units: radians) is computed for each icon in the following process
6. An actual displacement angle refers to an angle made with the reference axis on the map when an icon is actually arranged on the map.
6. First, the root at the first hierarchical level is positioned in the center of a map or the origin of the coordinate axis on the map.

When the parent node is a root belonging to the first hierarchical level, the value obtained in process 5 is assigned as an actual displacement angle to the current node which belongs to the second hierarchical level and is subordinate to the root.

The actual displacement angle of each node whose parent node belongs to the second or a subsequent hierarchical level is computed as follows.

(actual displacement angle)=ε−ζ/2+(value obtained in process 5)

ε=actual displacement angle of icon indicating parent node

ζ=angle assigned to icon indicating parent node

By the above listed equations, the actual displacement angle of the parent node of the current node is set in the center of the arranged angle of the brother nodes including the current node, and the actual displacement angle of the virtual reference axis is obtained to arrange a brother node by subtracting half of the angle assigned to the icon indicating the parent node from the actual displacement angle of the parent node. The virtual displacement angles obtained in process 5 for the brother nodes are added to the virtual reference axis. The result is the actual displacement angle based on which the brother nodes including the current node are arranged on the map. Thus, the actual displacement angle from the reference axis is obtained to determine the arrangement position of each node on the map.

Figure 8:
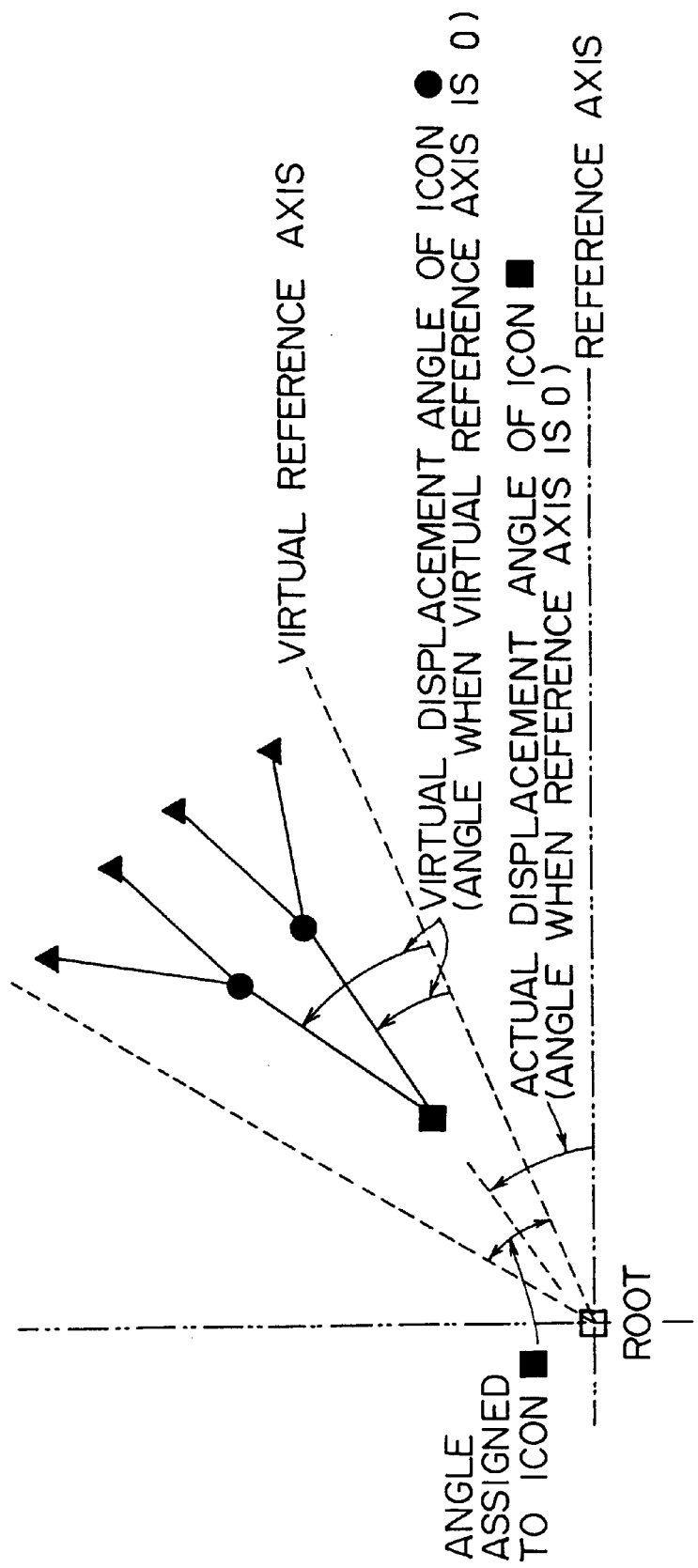
FIG. 8 shows the method (2) of determining the drawing position of each icon according to the embodiment shown in FIG. 4.

FIG. 8 shows the relationship among the angles obtained by the computation methods 1 through 6.

As shown in FIG. 8, the angle assigned to each node is based on the root at the center. For example, in FIG. 8, all nodes subordinate to one node which belongs to the second hierarchical level and is subordinate to the root are arranged such that they can be in the range of the angle assigned to the nodes at the second hierarchical level from the root. The angle assigned to the nodes at each hierarchical level is assigned to each of the brother nodes (including the current node) in the range of the angle assigned to a node (parent node) at the first lower hierarchical level from the root in proportion to the number of the child nodes.

When an assigned angle is obtained for each node, a virtual reference axis is assumed, and a displacement angle (virtual displacement angle) from the virtual reference axis is obtained. Finally, the virtual reference axis is determined from the actual displacement angle of the parent node and the angle assigned to the parent node, and the virtual displacement angle is added to the virtual reference axis, thereby obtaining an actual displacement angle at which the icon is to be positioned on the map.

Then, the distance from the center (hereinafter referred to as a drawing radius) is computed with the icon indicating the root centered.
7. The drawing radius of the root belonging to the first hierarchical level is 0.

The drawing radius at the second and subsequent hierarchical levels can be computed by the following equation.

$$(\text{drawing radius})=\eta+\tau\times 3$$

η=drawing radius of last hierarchical level

τ=size of icon where the value of '3' set to obtain the drawing radius is set only for convenience, and should be appropriately set by the user who uses the method according to the present embodiment.

Figure 9:
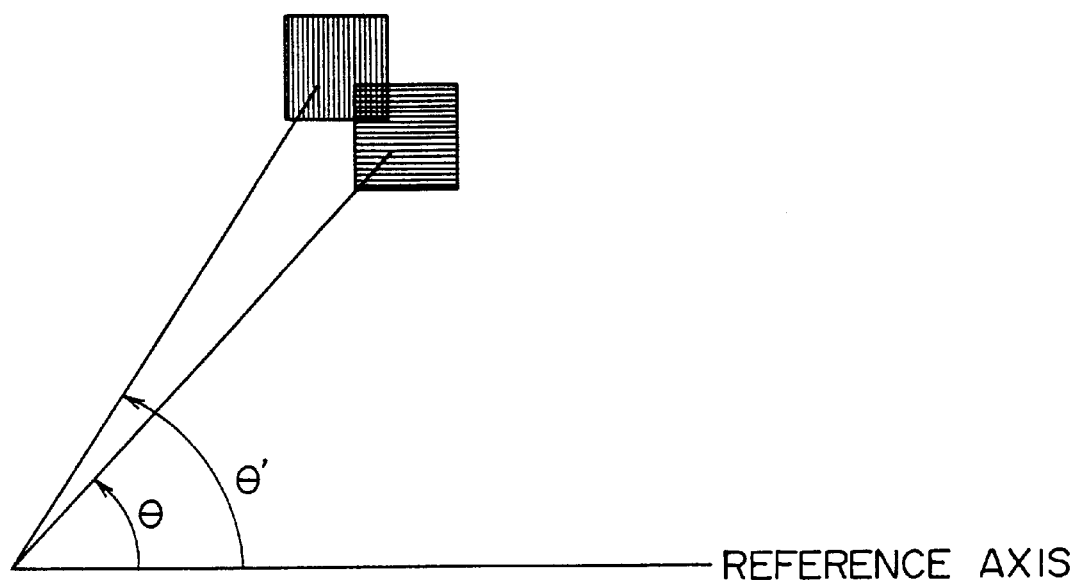
FIG. 9 shows the method (3) of determining the drawing position of each icon according to the embodiment shown in FIG. 4.

However, adjacent icons may be drawn as overlapping each other depending on the difference value between the displacement angles of the adjacent icons at the same hierarchical level. FIG. 9 shows this case. In process 7 above, the overlap of icons can be avoided by appropriately selecting the factor corresponding to '3' of the drawing radius. Since the factor is commonly used at all hierarchical levels, the differences in radius among all concentric circles become large if the value of the factor is set large to prevent the overlap of icons, thereby reducing the number of nodes displayed on one screen.

Described below is the method of computing the minimum value of the drawing radius r by the following expression to avoid the overlap of icons and obtain the largest possible number of nodes displayed on one screen.

$$(\text{minimum difference angle})\times r \geq \sqrt{(2)}\times\tau \therefore r \geq \sqrt{(2)}\times\tau/(\text{minimum difference angle})$$

where √(2)×τ indicates the size of the diagonal line of the icon.

The minimum difference angle refers to the minimum angle in all the differences of virtual displacement angles pre-stored in process 5. Since the units of the minimum difference angle are radians, the distance between icons arranged on concentric circles is obtained by multiplying the radius of the icon by the minimum difference angle. All icons can be automatically prevented from overlapping each other if the radii of the concentric circles are determined such that the two icons that are arranged to make the minimum angle with each other cannot overlap each other. Therefore, the above described expression means that the minimum distance between icons is larger than the length of the diagonal line of the icons. In the above described expression, the icons are assumed to be square, and the length (size) of the diagonal line of the icon is obtained by multiplying the length τ of one side of the icons by the square root of 2.

When the above described expression is satisfied, the drawing radius obtained in process 7 is used. When the above described expression is not satisfied, the drawing radius obtained in process 7 is newly set to a value equal to or larger than the minimum value in the expression.

The drawing position of each icon can be determined from the actual displacement angle and the drawing radius obtained in the above described procedure.

FIGS. 10 and 11 are flowcharts showing the process of realizing the method described by referring to FIGS. 7A through 9.

First, in step S10, the hierarchical level of the node to be processed is initialized as '1'. Then, in step S11, the assigned angle is computed for all nodes at the hierarchical level being processed based on the number of child nodes. The process in step S11 corresponds to the processes 1 through 3 described by referring to FIG. 7A through 9.

In step S12, it is determined whether or not the hierarchical level '1' is being processed. If yes, the node being processed is a root. Therefore, it is not necessary to amend the assigned angle in process 4, and control is passed to step S16 without amending the assigned angle in step S14. If it is determined in step S12 that the number of the hierarchical level being processed is larger than 1, the total of the assigned angles of the brother nodes is compared with the assigned angle of the parent node in step S13. If the assigned angle of the parent node is equal to or larger than the total of the assigned angles of the brother nodes, it is not necessary to amend the assigned angle of the node being processed. Therefore, control is passed to step S16 without amending the assigned angle in step S14. If it is determined in step S13 that the total of the assigned angles of the brother nodes is larger than the assigned angle of the parent node, then the assigned angle is amended according to process 4 above (step S15), and control is passed to step S16.

In step S16, the virtual displacement angles are computed for all nodes at the hierarchical level being processed in process 5 above. Simultaneously, the minimum difference angle is computed, and control is passed to step S17. In step S17, it is determined again whether the number of the hierarchical level being processed is '1' or larger than '1'. If it is determined that the hierarchical level '1' is being processed, the node being processed is a root. Therefore, control is passed to step S19, the virtual displacement angle is used as an actual displacement angle in process 6 above. That is, when the number of the hierarchical level is '1', the virtual displacement angle is 2π, and the actual displacement angle is 2π. Then, in step S21, the drawing position of the root on the map is set with the drawing radius set to 0 in process 7 above. If it is determined in step S17 that the number of the hierarchical level is larger than '1', then the actual displacement angle of the node being processed is computed based on the already computed actual displacement angle of the parent node (in process 6 above) in step S18. In step S20, the drawing radius is computed based on the drawing radius of the parent node (in process 7 above).

When the processes in step S21 or S20 are completed, control is passed to step S22, and it is determined whether or not there is the next hierarchical level. If yes, control is passed to step S24, the hierarchical level set value is incremented by '1', control is returned to S11, and the process is performed on the new hierarchical level. If it is determined in step S22 that there is no next hierarchical level, then control is passed to step S23, and a map is drawn based on the actual displacement angle and the drawing radius of each node obtained in the preceding processes, thereby terminating the current process.

Figure 12:
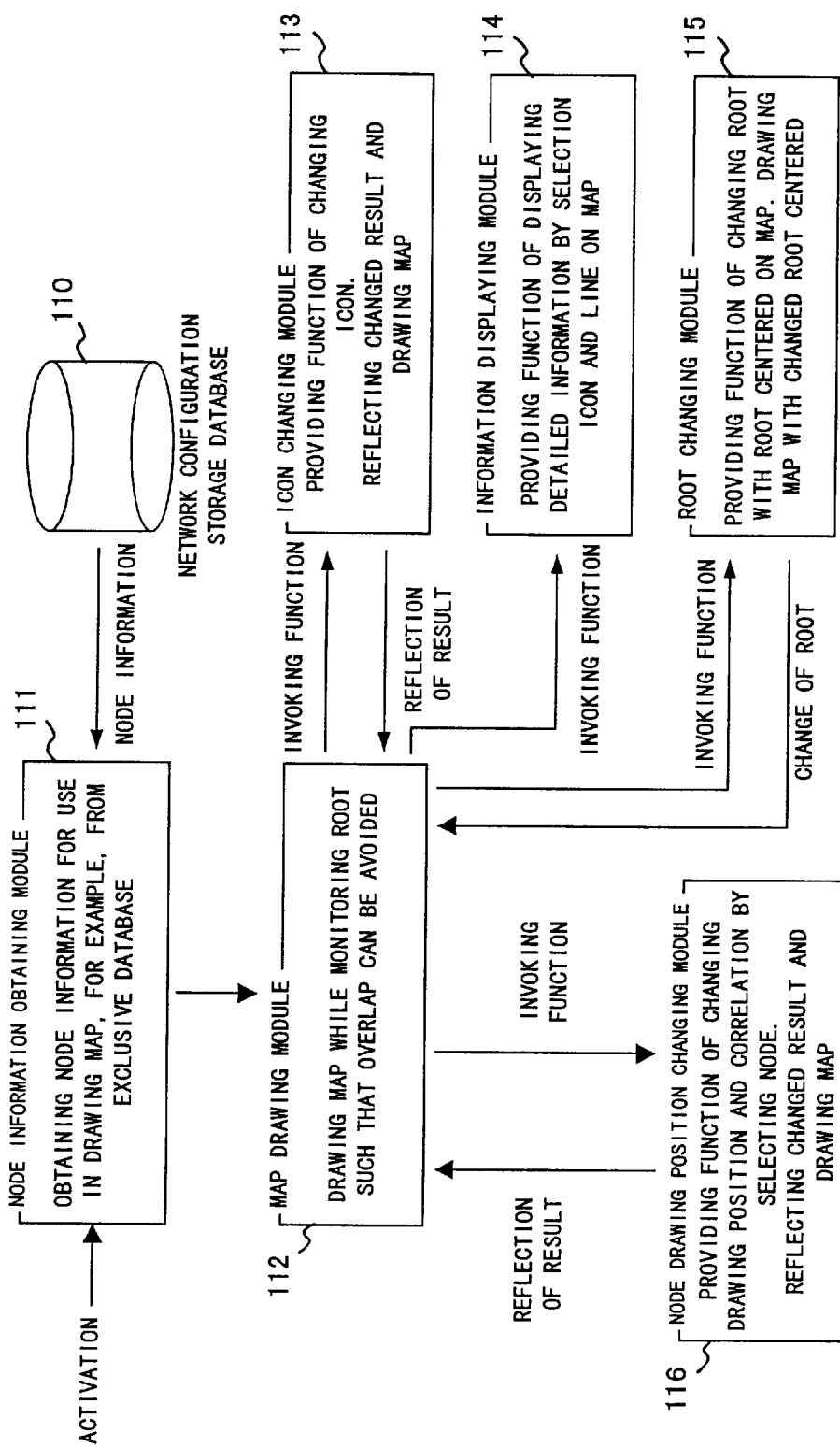
FIG. 12 shows the relationships among the functions of the program which realizes the method according to the present invention.

FIG. 12 shows the relationships among the functions of the program for realizing the method according to the present invention.

FIG. 12 shows as a module each of the functions of the program for realizing the method according to the present invention. When the program is activated, a node information obtaining module 111 starts operating and obtains the node information for drawing a map. The information can be input by the user. However, since there is a large volume of information about networks, an exclusive database is provided to obtain the information from the database. In FIG. 12, a network configuration storage database 110 is provided so that all information about networks can be obtained from the network configuration storage database 110. The network configuration storage database 110 also stores information required to draw a map such as the connections among nodes, etc. When the node information obtaining module 111 operates, the information can be obtained.

The data obtained by the node information obtaining module 111 is passed to the map drawing module 112, and is used for drawing a map. The map drawing module 112 draws a map by performing the process shown in the flowcharts in FIGS. 10 and 11, prevents icons indicating nodes from overlapping each other, and invokes the function of monitoring the nodes based on the root.

An icon changing module 113 is called by the map drawing module 112, and provides the function of changing an icon indicating each node. The result of changing an icon is reflected on the map drawing process performed by the map drawing module 112, and the icon is drawn according to the settings of the icon changing module 113.

An information displaying module 114 is called by the map drawing module 112 when an icon or a line is selected on the map, and displays detailed information corresponding to the selected icon and line. The display method can be followed by, for example, opening a new window near a selected icon or line, and displaying information in a text format in this window. The information displaying module 114 can also be designed to display information using various functions provided by the window system, etc.

A root changing module 115 provides the function of changing the root in the center of the map. When invoked by the map drawing module 112, the root changing module 115 specifies which node has been selected as a new root, and instructs the map drawing module 112 to draw a map using a new node as a root.

A node drawing position changing module 116 is invoked by the map drawing module 112 when the user requests to perform an operation of changing the drawing position of a node or the correlation between nodes. The node drawing position changing module 116 detects a node selected by the user, a change of the drawing position of the selected node, and the node correlation changing operation, returns the change results of these operations to the map drawing module 112, and reflect them on the map.

Figure 13A:
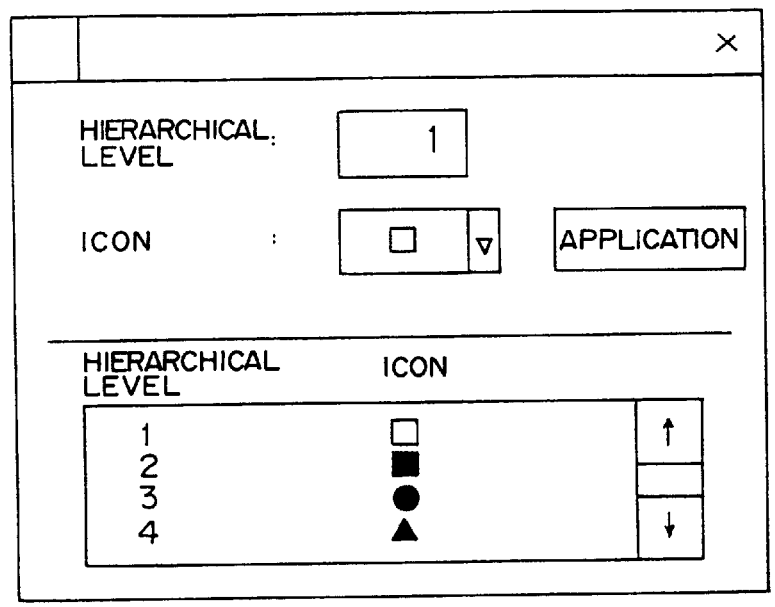
FIGS. 13A and 13B show the functions for changing the pattern of an icon at a user instruction.
Figure 13B:
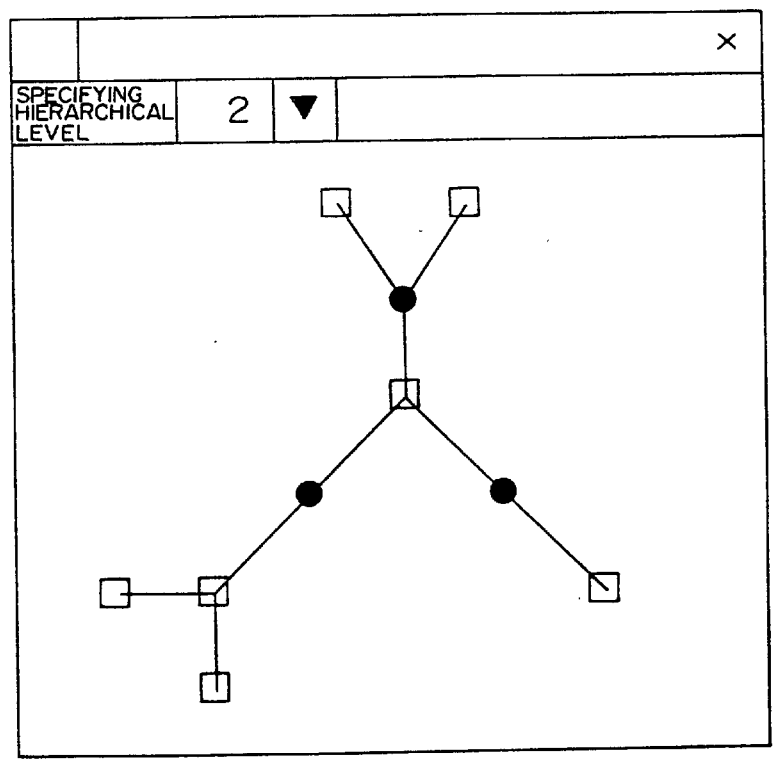

FIGS. 13A and 13B show the functions of changing the pattern of an icon at an instruction from the user.

In FIGS. 13A and 13B, the shape and color of an icon indicating a node displayed on the map is made different from those of another node.

Nodes can be monitored with a specified type of node regarded by differentiating the shape and color of an icon indicating a node from those of other types of nodes. FIGS. 13A and 13B show examples of providing a unit for realizing the process.

FIG. 13A shows an example of providing the function of setting the shape and color of an icon indicating a node for each hierarchical level. FIG. 13B shows an example of providing the function of drawing an icon belonging to a specified hierarchical level in different shape and color from those of other icons belonging to the other hierarchical levels by selecting a hierarchical level and node on a map.

FIG. 13A shows an example of a setting screen on which an icon indicating a node is set for each hierarchical level. On the screen, an icon setting window is displayed. In FIG. 13A, there are two input windows. One is an input window through which a hierarchical level is specified. The other is an input window through which the type of an icon applied to the hierarchical level is input. Below the window shown in FIG. 13A, the contents of the current settings are displayed. For example, a node at the first hierarchical level is indicated by a white square, a node at the second hierarchical level is indicated by a black square, and so forth. When the number of a hierarchical level and an icon are to be set and defined in the input window, the 'application' button shown in FIG. 13A should be pressed. When an icon is set, the arrow button beside the icon input window should be pressed to list the types of icons entered in the device, and the user can select an optional icon from the menu of the listed icons.

In FIG. 13A, an icon indicating a node is specified on the map, and a method of providing the function of changing the icon is illustrated. The user can select an optional icon on the map by clicking the mouse button, etc. with the icon pointed to by the pointer on the map. When the icon is selected, a selection menu containing the patterns as shown in FIG. 13A is displayed, and an optional pattern is selected from the menu. In the above described operation, the pattern of the icon is changed into a new pattern displayed on the screen.

FIG. 13B shows the icons indicating the nodes only at the hierarchical level to be regarded as distinguished from the others. That is, in FIG. 13B, the icons indicating the nodes only at the second hierarchical level are indicated by black circles. Other nodes are all indicated by white squares. Thus, by distinguishing the icons indicating the nodes only at the hierarchical level to be regarded from the icons indicating the nodes at the other hierarchical levels, the network can be monitored with only a specified hierarchical level regarded. For example, in FIG. 13B, when a root node is changed, the map is changed with the pattern of the icon remaining unchanged. The user can view the map and monitor the nodes indicated by black circles from the viewpoint of another node. Therefore, the configuration of the network can be checked from various point of views.

Figure 14:
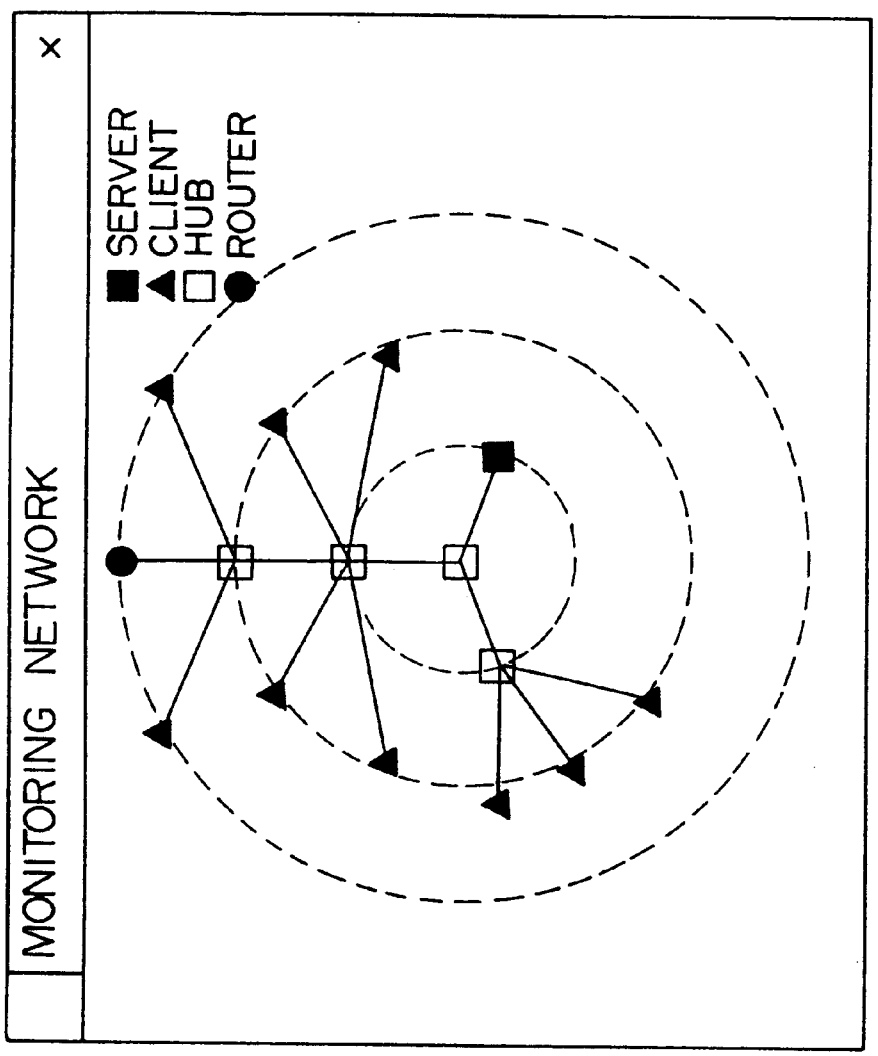
FIG. 14 shows an example of changing a map into the display appropriate for a network monitor using the icon changing function shown in FIGS. 13A and B.

FIG. 14 shows an example of the case where a map is displayed in the format appropriate in monitoring a network using the icon changing function shown in FIGS. 13A and 13B.

In FIG. 14, an icon is not changed for each hierarchical level, but for each type of node in the network. In the example shown in FIG. 14, servers are indicated by black squares, clients are indicated by black triangles, hubs are indicated by white squares, and routers are indicated by black circles.

Thus, there are several types of nodes indicated on the map when monitoring a network. If they have different functions, the network configuration can be easily understood by changing an icon for each type of node. In FIG. 14, one of the hubs is displayed as a root, and it can be intuitively grasped that one server and two hubs are connected to the root hub.

Especially, by changing an icon for each type of node, the general configuration of a network viewed from the root node can be grasped at one glance, and a specific type of node can be immediately located in the network, thereby effectively monitoring the network.

Figure 15:
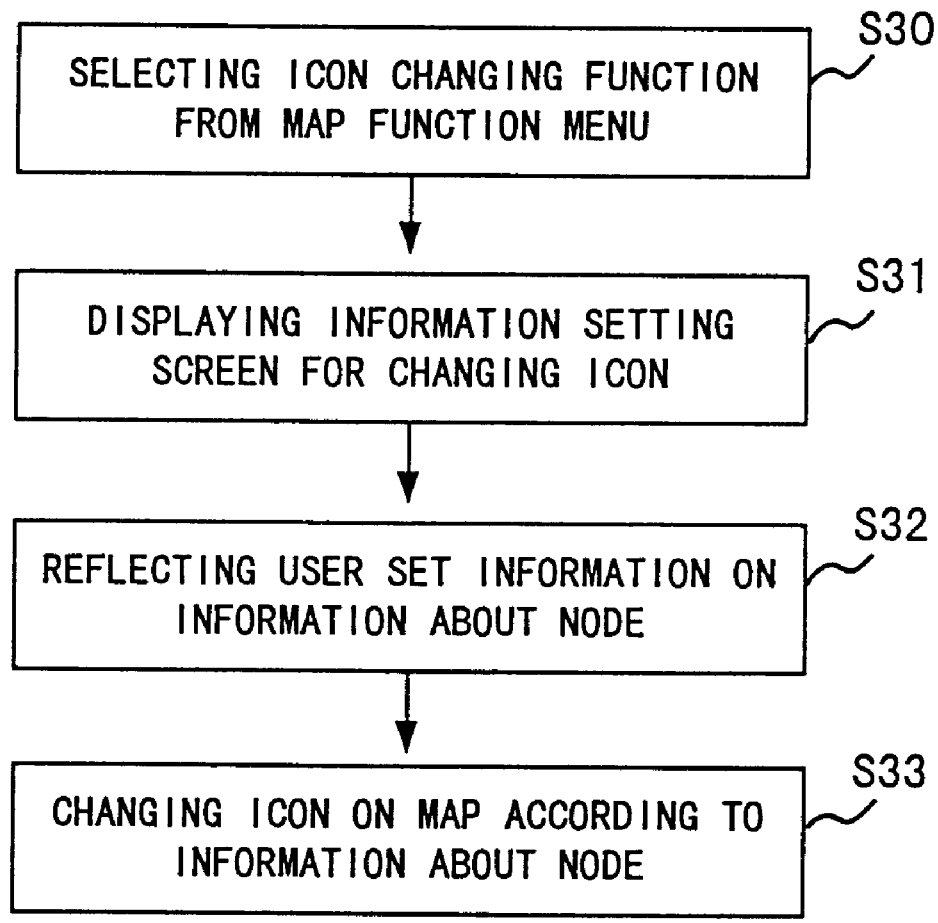
FIG. 15 is a flowchart showing the process for realizing the function explained by referring to FIGS. 13A–14.

FIG. 15 is a flowchart showing the process of realizing the function described by referring to FIGS. 13A, 13B, and 14.

In step S30, the icon changing function is selected from the function menu on the map. In step S31, the information setting screen is displayed to change an icon as shown in FIGS. 13A and 13B.

In step S32, the user inputs setting information on the setting screen when the information about nodes is to be changed. Then, an icon is changed on the map according to the information about the node changed in step S32 (step S33).

Figure 16:
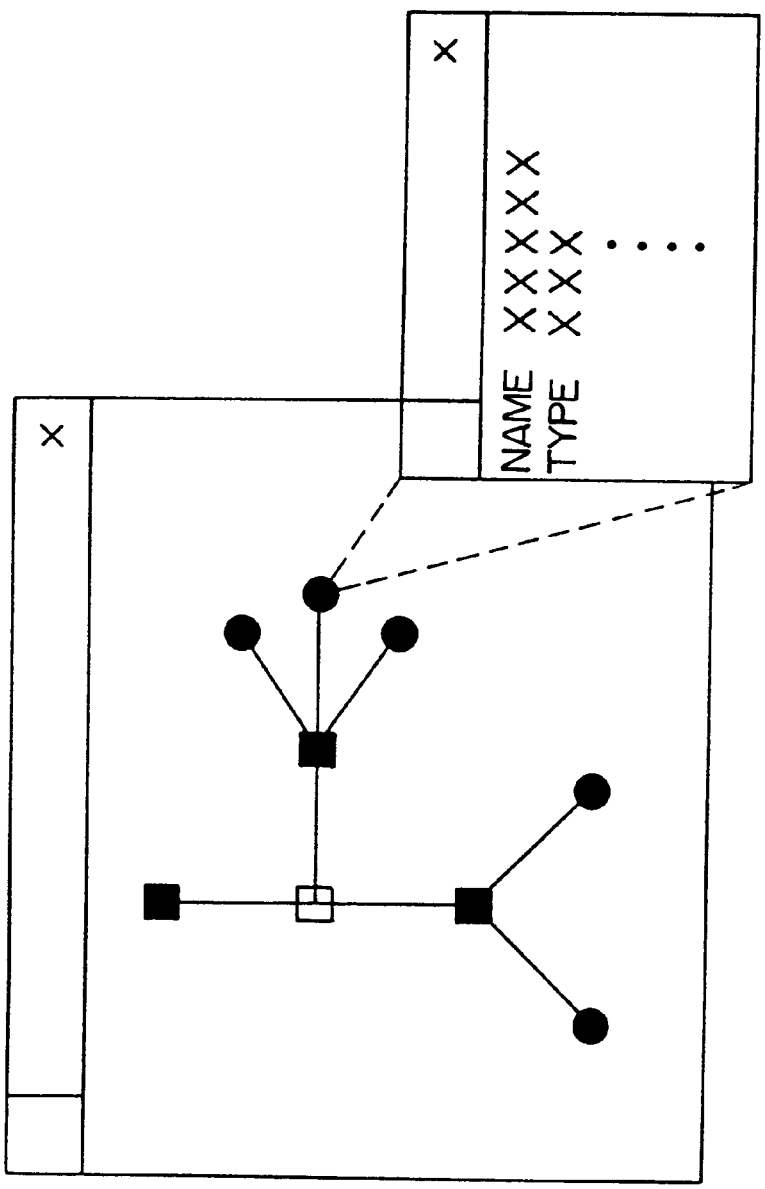
FIG. 16 shows an example of presenting the functions of providing information about nodes and the adjacency between nodes.

FIG. 16 shows an example of providing the function of issuing information about nodes and adjacency of the nodes.

FIG. 16 actually shows the function of selecting an icon and a line connecting icons on a map, and then issuing detailed information about a selected node and detailed information about the adjacency between nodes connected by the selected line.

As shown in FIG. 16, when an icon and a line connecting icons are selected on a map, another window is opened to output information about a node and the correlation between nodes, etc. In FIG. 16, the name and the type of a node are shown as the information about the node. The method of opening the window and providing the information can be opening the window as described above using the function incorporated into the window system, etc., and outputting text data to the window.

Figure 17:
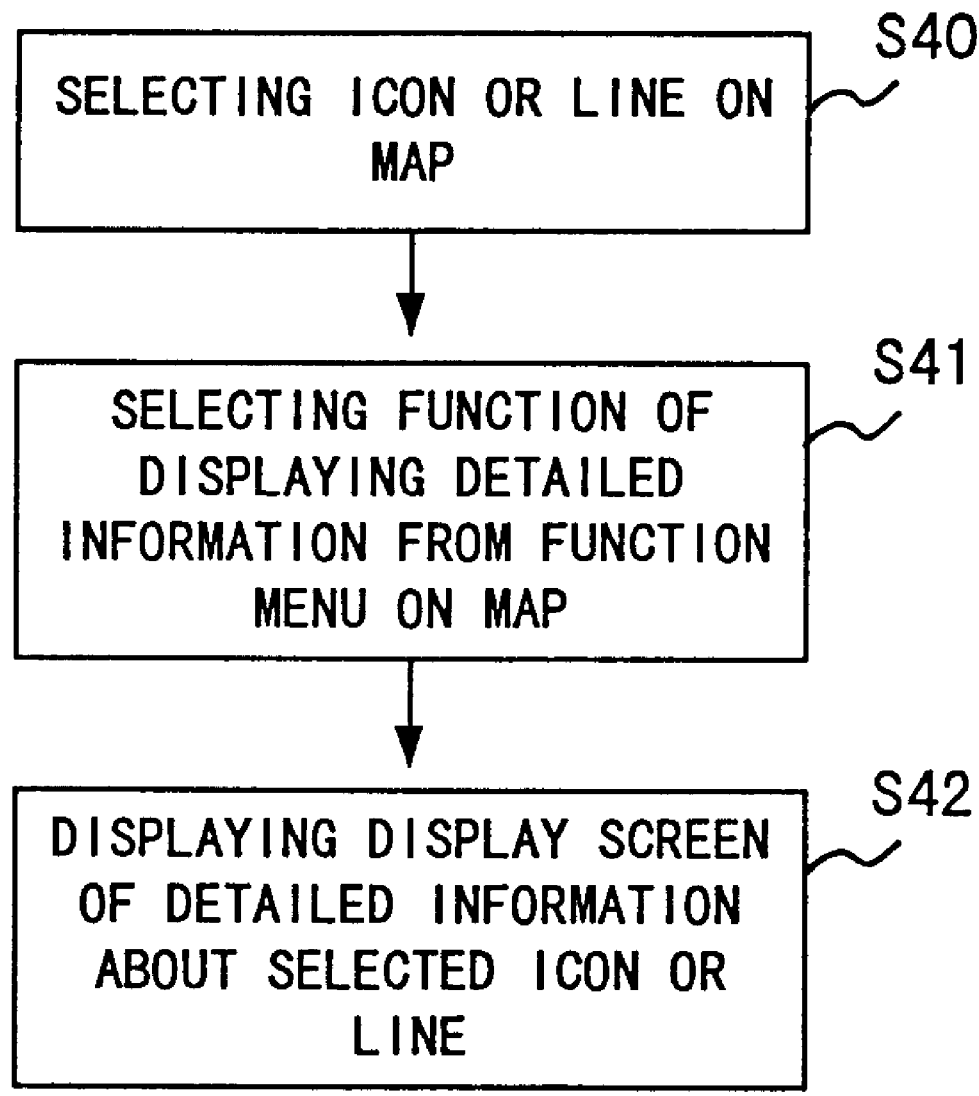
FIG. 17 is a flowchart showing the process of realizing the function shown in FIG. 16.

FIG. 17 is a flowchart showing the process for realizing the function shown in FIG. 16.

First, when a map is displayed, an icon or a line on the map is selected (step S40). Then, the function of displaying detailed information is selected from the function menu on the map (step S41). If the user selects an icon or a line connecting icons, then detailed information about the selected icon or line is displayed on the display screen in step S42.

As shown in FIG. 16, the information about each node can be referred to by selecting an icon and a line connecting icons on a map, and providing the function of issuing the information about a node indicated by the icon and the adjacency between nodes. In the example shown in FIG. 16, the information about a node is displayed on the screen when the node is selected. However, summary information can be constantly displayed on the map, or node information can be output as voice information.

Figure 18:
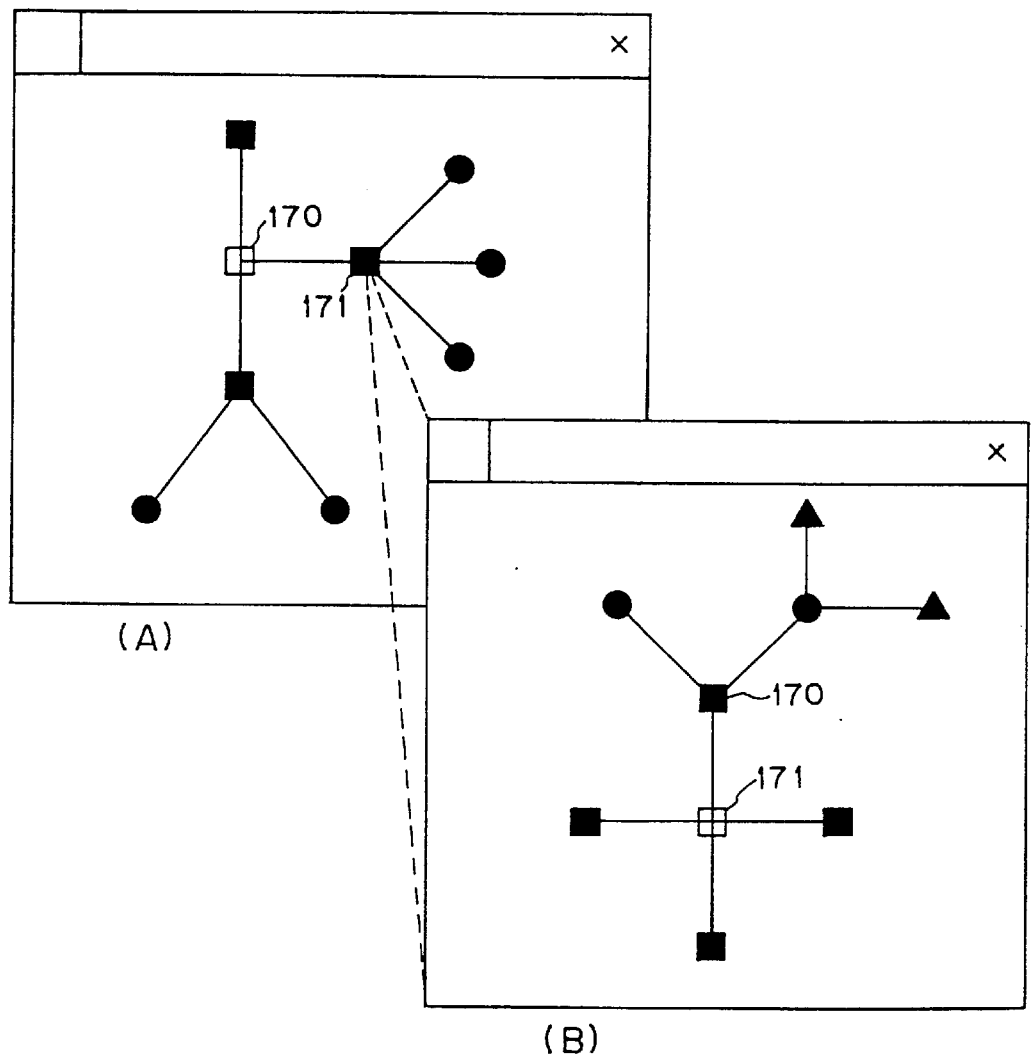
FIG. 18 shows an example of presenting the function of changing a root.

FIG. 18 shows an example of providing the function of changing a root.

FIG. 18 actually shows the function of newly drawing a map according to the present invention by the user selecting an icon indicating a node as a new root.

Assume that the map shown in (A) of FIG. 18 is first displayed. The icon indicating a root is indicated by a white square. If the user selects a node at the left of the root, the map is drawn with the selected node set as a new root as shown in (B) of FIG. 18. In FIG. 18, the icons at the same hierarchical level are indicated by the same pattern. When (A) of FIG. 18 is compared with (B) of FIG. 18, a node 170 is a root first as shown in (A) of FIG. 18, but is the node 170 at the second hierarchical level. On the other hand, a node 171 belongs to the second hierarchical level in (A) of FIG. 18, but is a root node 171 in (B) of FIG. 18.

Figure 19:
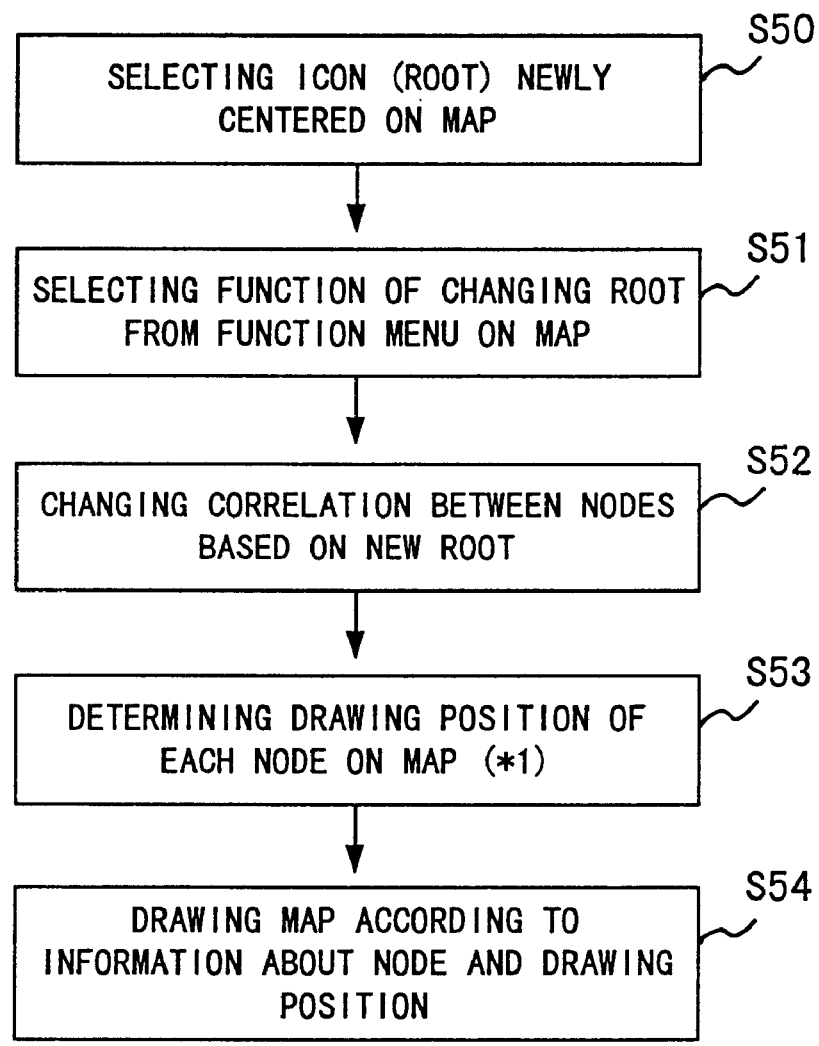
FIG. 19 is a flowchart showing the process of providing the function shown in FIG. 18.

FIG. 19 is a flowchart showing the process for realizing the function shown in FIG. 18.

First, an icon (new root) in the center of the map is selected using a mouse button, etc. (step S50). Then, in step S51, the root changing function is selected from the function menu on the map. In step S52, the information about the correlation between nodes is changed into the information based on the new root. In step S53, the drawing position of each node is determined on the map in the processes shown in FIGS. 10 and 11. Finally, in step S54, the map is re-drawn according to the information about the nodes and the drawing positions.

As shown in FIG. 18, a target to be monitored can be changed at any time by selecting an icon on a map and drawing the map using the node indicated by the selected icon as a new root. In the example shown in FIG. 18, a new map is drawn each time the root is changed. However, the original map can be re-drawn instead of drawing a new map.

Figure 20:
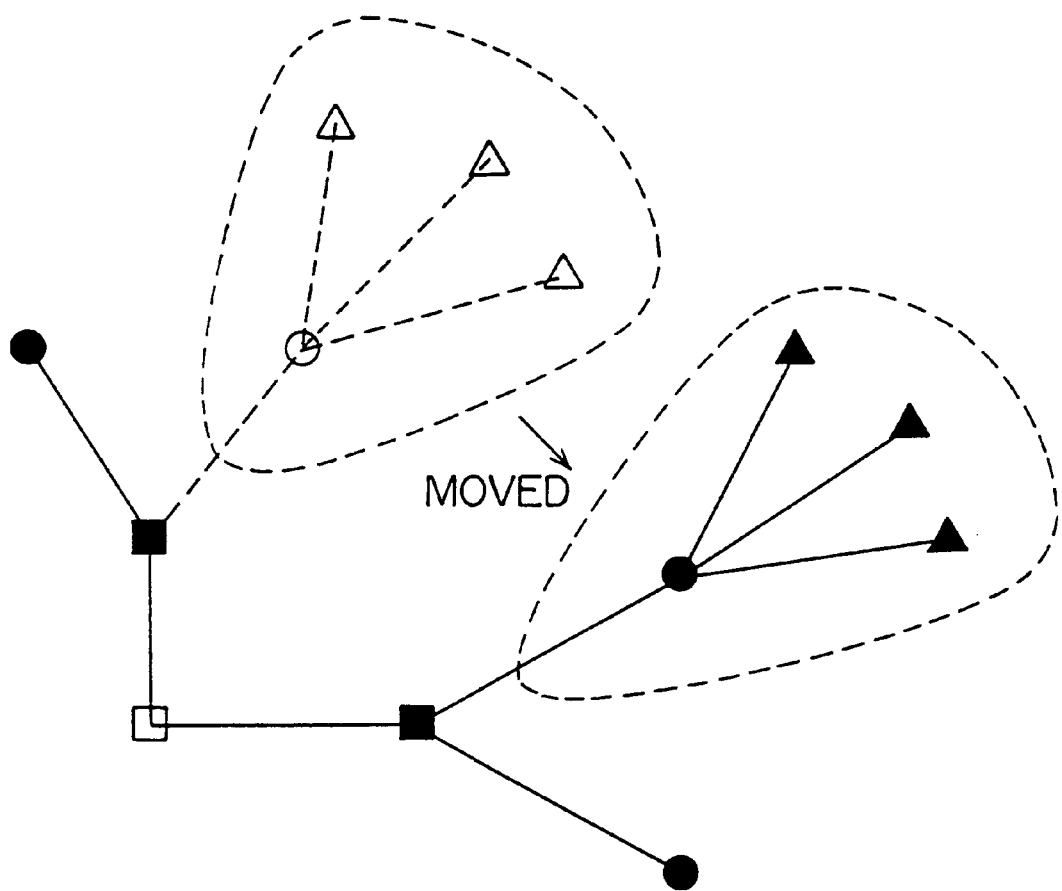
FIG. 20 shows an example of presenting the function of changing the drawing position of a selected icon and the correlation between the selected icon and another icon.

FIG. 20 shows an example of providing the function of changing the drawing position of a selected icon and the correlation between the selected icon and another icon.

The user can select an icon on a map and change the drawing position of the icon and the correlation between the icon and another icon. At this time, the drawing positions of other icons can be automatically amended so that the amended map can follow the map drawing method of the present invention.

In FIG. 20, a node at the third hierarchical level (the root is indicated by a white square) and its subordinate node are selected and moved to be subordinate to another node at the second hierarchical level. Thus, the user can optionally restructure the network configuration and generate the optimum network configuration. Therefore, when a network is designed, the configuration of the network can be preliminarily checked. As a result, a network can be not only monitored but also appropriately designed.

Figure 21:
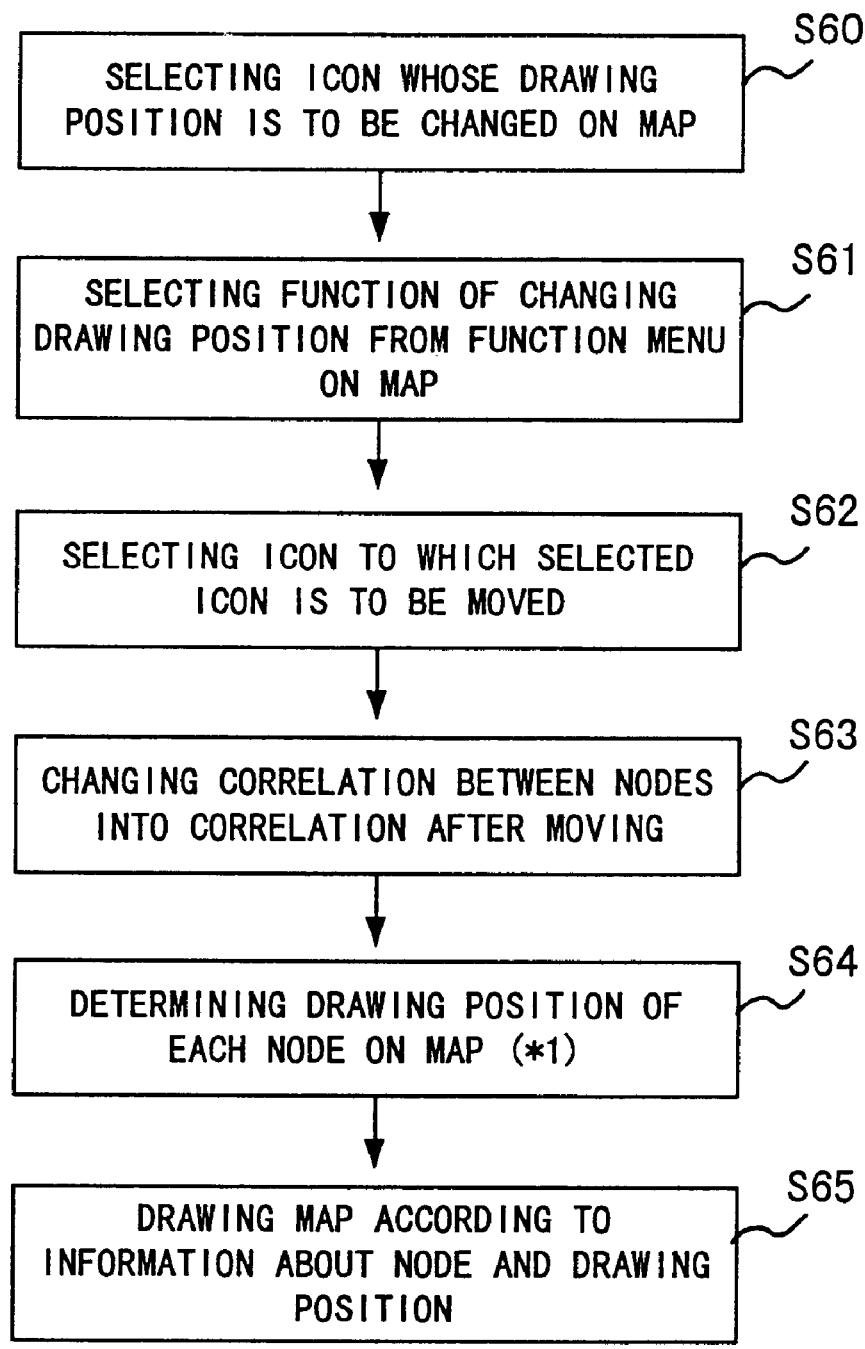
FIG. 21 is a flowchart showing the process of realizing the function shown in FIG. 20.

FIG. 21 is a flowchart showing the process for realizing the function shown in FIG. 20.

In step S60, the user selects an icon whose drawing position is to be changed. In step S61, the drawing position changing function is selected from the function menu on the map. In step S62, an icon to which the selected icon is moved is selected. In step S63, the correlation between nodes is changed into the correlation including the moved icon. In step S64, the drawing position of each node is determined on the map. The process in step S64 follows the process described by referring to FIGS. 10 and 11. In step S65, a map is drawn according to the information about nodes and the drawing positions.

As shown in FIG. 20, the correlation of a target to be monitored can be easily grasped or changed by providing the function of changing the drawing position of an icon and the correlation between the icon and another icon by selecting the icon on the map. As a result, the supervisor can optionally change the layout on the map. The layout of a map can be manually changed by a supervisor, or can be automatically changed by recognizing a change in correlation.

According to the above described map drawing system and function, a map is drawn to monitor the correlation between a root and its subordinate nodes.

When the functions shown in FIGS. 20 and 21 are used, some icons may overlap each other or the lines connecting icons may intersect each other. As shown in the flowchart in FIG. 21, when the position or the correlation of an icon is to be changed, a new map is drawn by the above described drawing method, thereby automatically avoiding the above described overlap or intersection.

Figure 22:
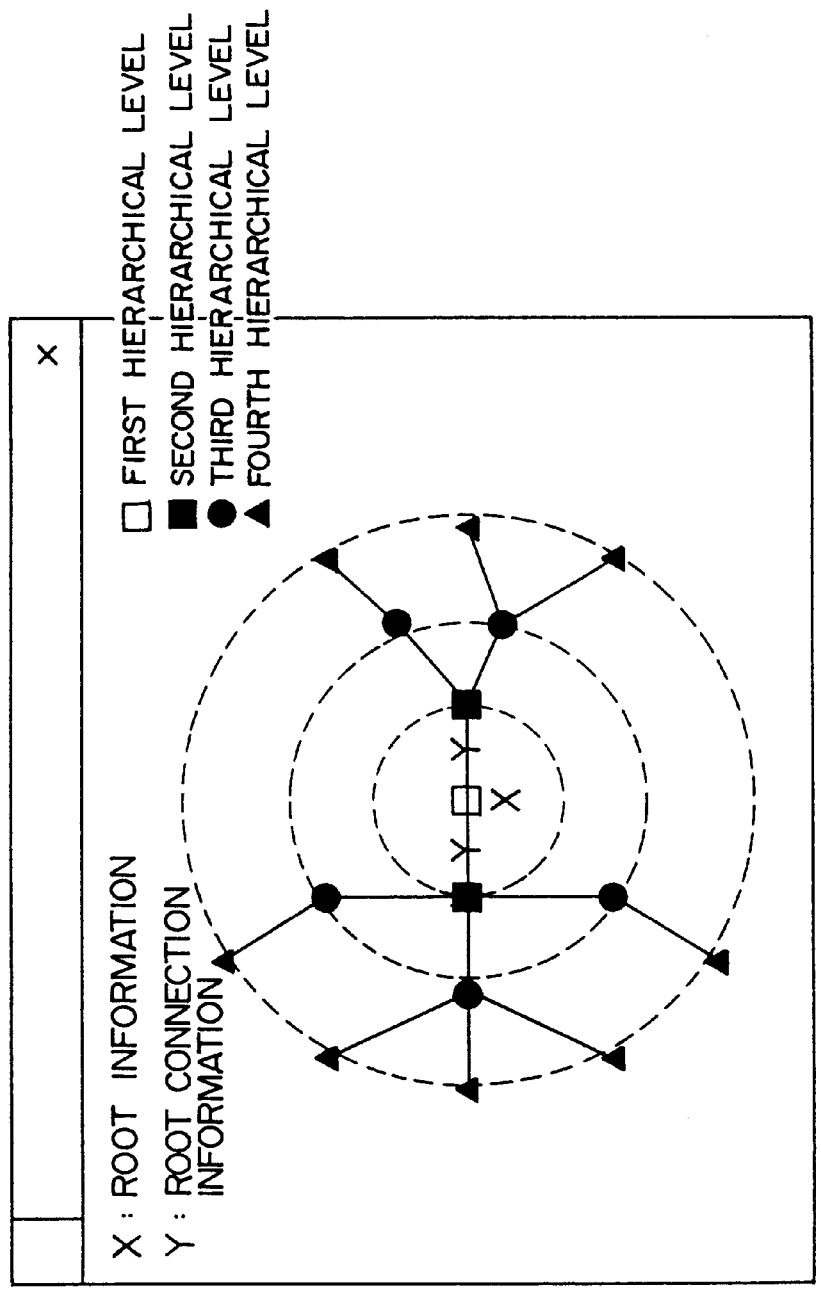
FIG. 22 shows the function of displaying around the root the information about the root.

FIG. 22 shows the function of displaying the information about a root near the root.

In FIG. 22, a map is drawn using icons different for each hierarchical level. A root at the first hierarchical level is indicated by a white square. A node at the second hierarchical level is indicated by a black square. A node at the third hierarchical level is indicated by a black circle. A node at the fourth hierarchical level is indicated by a black triangle. If a network is monitored with the root positioned in the center in such a map, the information about the root is displayed around the root.

FIG. 22 shows, as an example, root information and root connection information. The root information relates to a root itself such as the name of a root, the type of the CPU used for the root, etc. The root connection information relates to, for example, the amount of traffic indicating the volume of communications established between the root and adjacent nodes. The root information is displayed below the root icon, and the root connection information is displayed on the line connecting root and the adjacent node.

By the above described display method, a network can be efficiently monitored by setting a node to be regarded as a root and reading the information around the root.

FIG. 23 is a flowchart showing the process for realizing the function shown in FIG. 22.

First, the root area information displaying function is selected from the function menu on the map (step S70). Then, the information for monitoring around the root is displayed (step S71). In step S71, the information about a root is obtained from the network configuration storage database 110 shown in FIG. 12, and the data around the root on the map is displayed. The information about the root itself is to be displayed near the root icon, for example, immediately below the icon. The information (amount of traffic, etc.) about the line connecting the root icon and another icon is to be displayed near the line. The practical display position should be appropriately determined by a producer of an actual program.

According to the above described embodiment, a map is drawn to monitor the correlation between a root and the subordinate nodes so that the correlation between them can be easily grasped and each piece of information can be easily referred to. Furthermore, a map can be easily amended based on the change of a target to be monitored, the change of the correlation, or at a request from a supervisor.

As a result, the correlation between a root and the subordinate nodes can be efficiently monitored using a map drawn according to the present embodiment.

Figure 24:
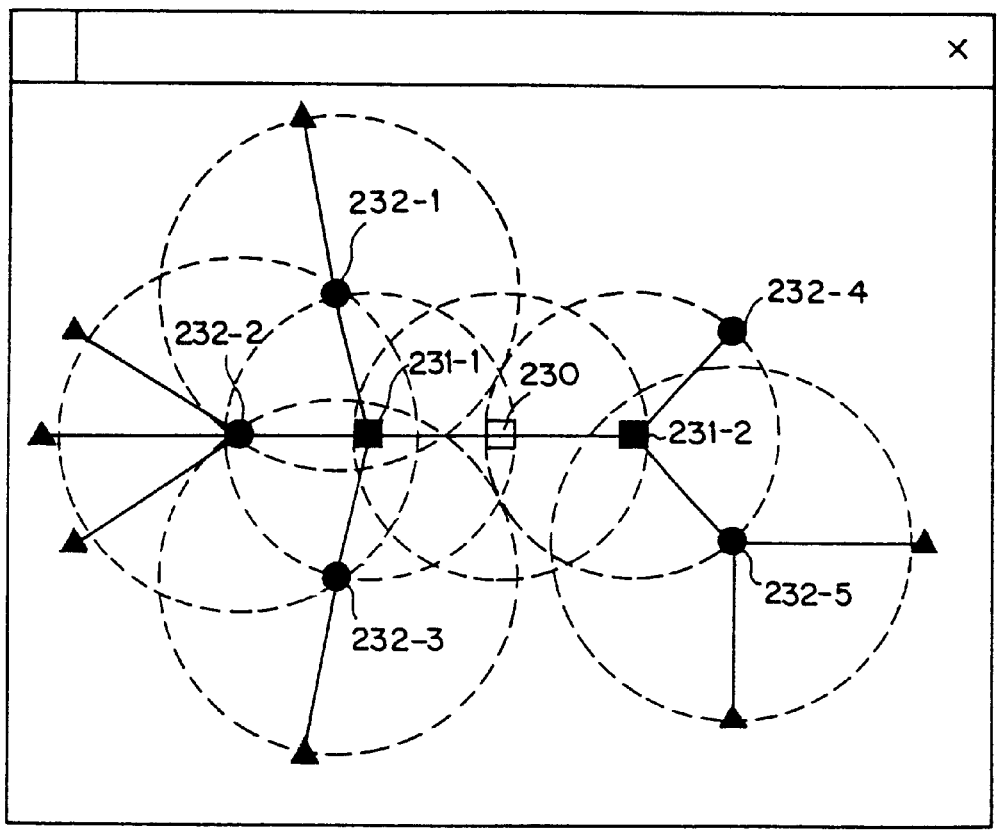
FIG. 24 shows another embodiment of the method of displaying an icon of a node on a map.

FIG. 24 shows another embodiment of displaying an icon indicating a node on a map.

According to the embodiment shown in FIG. 24, icons indicating nodes subordinate to a node belonging to one hierarchical level lower than the subordinate nodes are drawn at an equal distance from the icon indicating the node belonging to one hierarchical level lower. Thus, icons indicating adjacent subordinate nodes are drawn on the circumference of a circle having an icon indicating a node in the center.

In the display method shown in FIG. 24, a root 230 is positioned in the center of the icons, and the icons at the second hierarchical level (indicated by black squares) are drawn on the circumference of a circle with the root 230 positioned in the center. According to the above described embodiment of a map display method, icons at all hierarchical levels are arranged on the circumferences of concentric circles with the root positioned in the center. According to the present embodiment, the icons at the third hierarchical level are arranged on the circumference of the circle with the icon of the parent node positioned in the center. That is, icons (black circles) indicating the nodes 232-1, 232-2, and 232-3 at the third hierarchical level subordinate to an icon indicating the node 231-1 at the second hierarchical level are arranged on the circumferences of the circles with the node 231-1 in the center. Additionally, icons 232-4 and 232-5 indicating the nodes subordinate to the node 231-2 at the second hierarchical level are arranged on the circumference of the circle with the icon of the node 231-2 positioned in the center. Similarly, the icons indicating the nodes at the fourth hierarchical level (indicated by black triangles) having the nodes 232-1, 232-2, 232-3, and 232-5 at the third hierarchical level as respective parent nodes are arranged on the circumferences of the circles having the respective parent nodes in the center.

As described above, it is easily recognized that icons are arranged with the root positioned in the center, and that the farther an icon is arranged from the root on the map, the farther it is actually arranged from the root in the practical network. Therefore, the effect of the map display method as shown in FIG. 4 can be realized.

Figure 26:
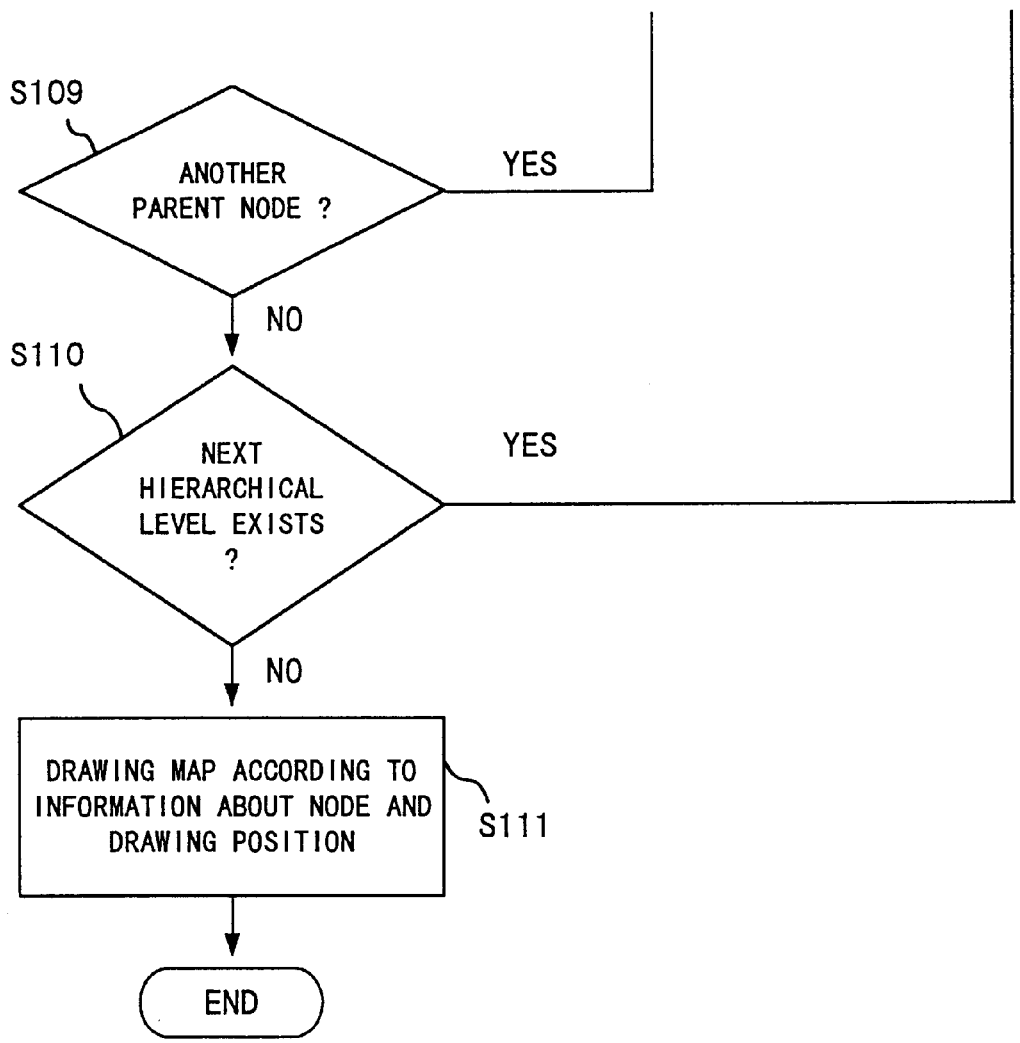
FIG. 26 is a flowchart (2) showing the process of displaying the map shown in FIG. 24.

FIGS. 25 and 26 are flowcharts showing the process of displaying icons as shown in FIG. 24.

First, in step S100, the information about nodes and the correlation between the nodes is obtained. The information is read from an exclusive database. Then, in step S101, the angle assigned to the root (having a hierarchical level of 1) is set to $2\pi$, and the actual displacement angle is set to 0. In step S102, the icon of the root is drawn in the center of the map. In step S103, the hierarchical level to be processed is set to 2. In step S104, a parent node is set. When the hierarchical level is 2, the parent node in step S104 is a root.

In step S105, the angle assigned to the parent node is distributed to the brother nodes belonging to the corresponding parent node, and the angle assigned to the current node is computed. The computation method is described later. Then, in step S106, a drawing radius is computed such that adjacent nodes do not overlap each other. The drawing radius is also described later. In step S109, it is determined whether or not another parent node exists at the same hierarchical level other than the parent node defined in step S104. If yes, the next parent node is set in step S107, and the drawing position of the current node belonging to the next parent node is computed back in step S105. If it is determined that another parent node does not exist in step S109, then it is determined in step S110 whether or not the next hierarchical level exists. If yes, the set value for the hierarchical level to be processed is incremented by 1 in step S108, and the following processes are performed back in step S104.

If it is determined in step S110 that there is no next hierarchical level, then a map is drawn in step S111 according to the drawing position of the node obtained in the above described processes and the information about the node read from the database in step S100, thereby terminating the process.

Figure 27:
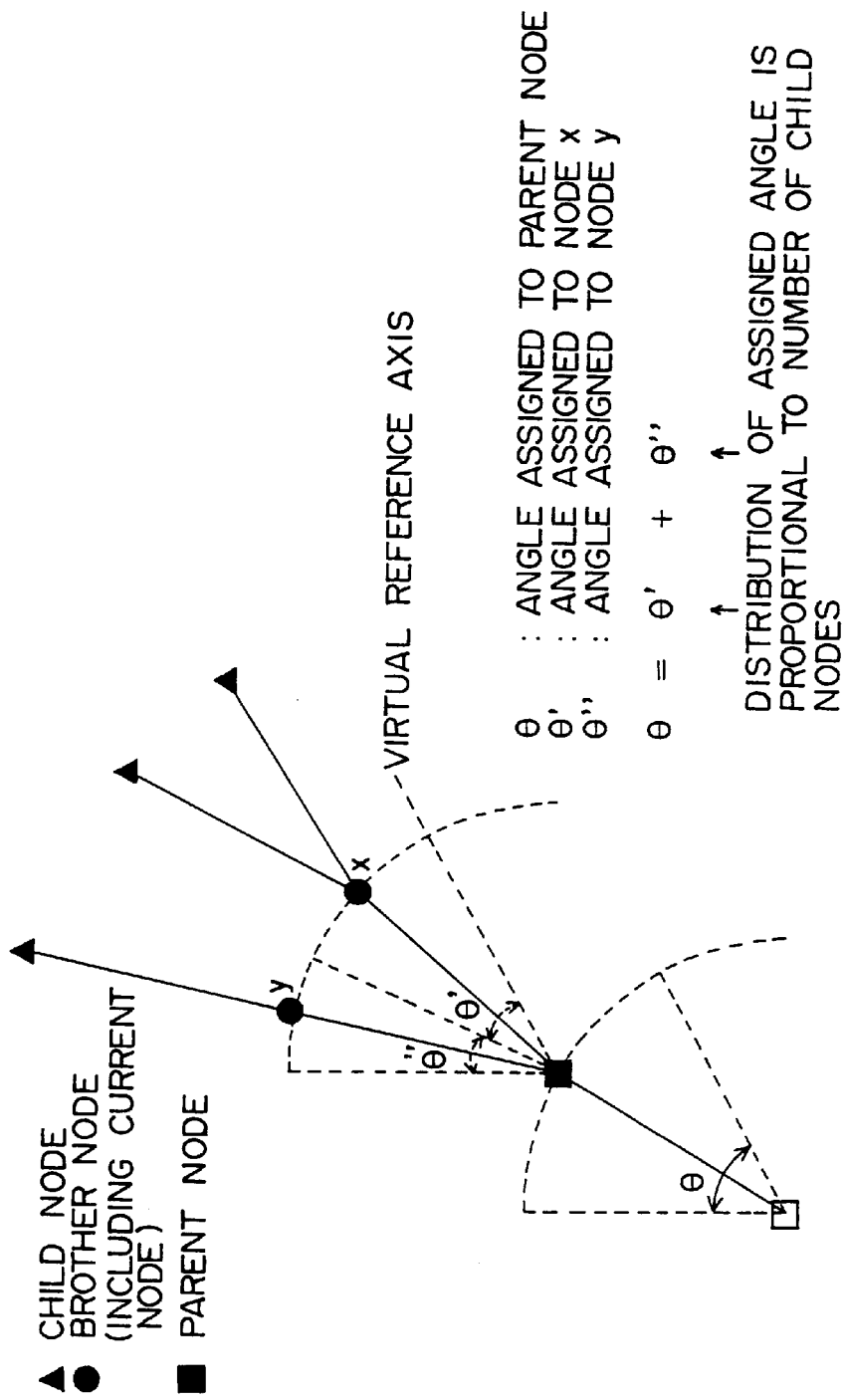
FIG. 27 shows the method (1) of computing an assigned angle and a drawing radius shown in FIG. 25.
Figure 28:
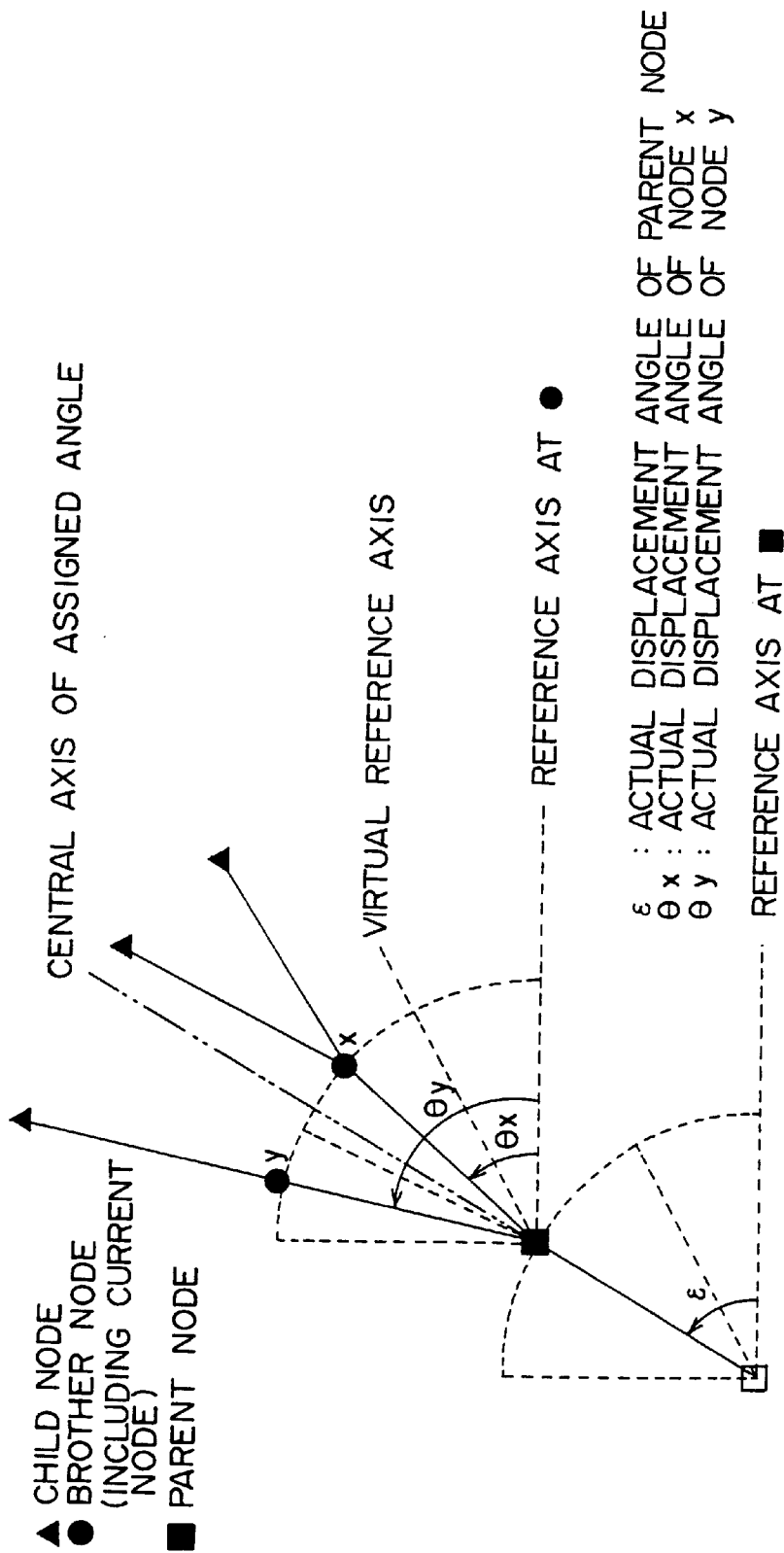
FIG. 28 shows the method (2) of computing an assigned angle and a drawing radius shown in FIG. 25.

FIGS. 27 and 28 show the method of computing the assigned angle and the drawing radius shown in FIG. 25.

First, the number of nodes (hereinafter referred to as child nodes) belonging to the node to be processed (hereinafter referred to as a current node) is computed. If there are no child nodes, it is assumed that virtual child nodes exist, and the number of child nodes is set to 1.

Next, the number of child nodes are added up for all nodes (hereinafter referred to as brother nodes) belonging to the parent node of the current node.

By the following equation, the angle assigned to the icon indicating the current node is computed. (angle assigned to current node)=(angle assigned to parent node)/(number of all child nodes belonging to brother nodes)×(number of child nodes belonging to current node)

Thus, the angle assigned to the parent node is distributed to the brother nodes belonging to the parent node, and the angle assigned to the current node is obtained. The distribution rate is proportional to the number of child nodes as in the computation method in the computation processes 1 through 3 indicated by the computation example shown in FIG. 4.

As shown in FIG. 27, the angles $\theta'$ and $\theta''$ assigned to the parent node are respectively assigned to brother nodes x and y including the current node. The node x has two child nodes, and the node y has only one child node. Therefore, $\theta'$:$\theta''$=2:1.

Next, the virtual displacement angle is computed. A virtual displacement angle is described in the explanation of the computation by referring to FIG. 4. It is a displacement angle from a virtual reference axis when the angles assigned to all brother nodes including the current node are added up, and one end is set as a reference (virtual reference axis shown in FIG. 27).

The computation of the virtual displacement angle is the same as the computation in step 5 of the computation method shown in FIG. 4. A minimum difference angle is stored for use in computing the drawing radius later.

Then, the actual displacement angle is computed. However, in the drawing method shown in FIG. 24, the current node is drawn on the circumference of the circle having the parent node positioned in the center. Therefore, the drawing position of the parent node is defined as the center of the coordinate axis. (In FIG. 4, the drawing position of the root is always defined as the center of the coordinate axis.) In computing the actual displacement angle, the equation in step 6 of the computation method applied in the display method shown in FIG. 4 can be used as is.

FIG. 28 shows the relationship among the actual displacement angle $\epsilon$ of the parent node, the actual displacement angle $\theta x$ of the node x, and the actual displacement angle $\theta y$ of the node y. The reference axis used when the actual displacement angle of the parent node is obtained is parallel with the reference axis used when the actual displacement angle of the brother node is obtained. For example, the x axis, etc. of the coordinate axis on the screen is adopted. However, in the present embodiment, since each of the current nodes is arranged on the circumference of the circle having the parent node in the center, the center of the coordinate axis is moved such that it matches the parent node.

Finally, the drawing radius is computed. In FIG. 4, the drawing radius is equal to the distance from the center when the root is centered. In FIG. 24, when the parent node is centered, the drawing radius is equal to the distance from the center. Therefore, the drawing radius is computed by the following equation.

(drawing radius r)=τ×3

τ=size of icon where the factor '3' should be appropriately set as described above, and the value of '3' is set for convenience.

Furthermore, as in the case shown in FIG. 4, the minimum value of the drawing radius r is computed using the preliminarily stored minimum difference angle by the equation in the above described step 7 to avoid the overlap between adjacent icons. The icons are drawn by setting the drawing radius to a value equal to or larger than the smallest value.

The method of drawing icons shown in FIGS. 24 through 28 is equivalent to the method of drawing icons shown in FIGS. 4 through 11. Each of the functions described by referring to FIG. 12 and the subsequent figures can be applied when the method of drawing icons shown in FIGS. 24 through 28 is used.

As described above, according to the present invention, the map indicating the correlation between the root to be regarded and the subordinate nodes can be drawn such that the configuration and the information about each node can be easily grasped, thereby efficiently performing the monitoring operation.

What is claimed is:

1. A method of displaying icons, comprising the steps of:
   drawing an icon indicating an object to be regarded;
   drawing icons indicating objects related to the object to be regarded and having an equivalent correlation at an equal distance from the icon indicating the object to be regarded; and
   connecting icons indicating adjacent objects using a line wherein:
      a correlation between the object to be regarded and a related object is indicated on circumferences of concentric circles.

2. The method according to claim 1 wherein:
   a form and a color of icons indicating the objects having the equal correlation are made different from forms and colors of icons indicating objects having different correlations so that the objects having the equal correlation can be easily identified.

3. The method according to claim 1 wherein:
   a drawing position of each icon can be automatically determined such that drawn icons or lines connecting icons do not overlap each other.

4. The method according to claim 1 wherein:
   detailed information about objects and an adjacency between the objects is displayed by selecting an icon indicating an object or a line connecting icons.

5. The method according to claim 1 wherein:
   a drawn icon indicating an optional object is selected to re-draw the selected object as a new object to be regarded.

6. The method according to claim 1 wherein:
   a drawn icon indicating an optional object is selected to change a drawing position of the icon indicating the selected object and a correlation with another icon, and a drawing position of an icon can be automatically amended such that possible overlap or intersection between icons and a line connecting the icons as a result of the change can be avoided.

7. The method according to claim 1 wherein:
   information about the object to be regarded and information about a correlation between the object to be regarded and an object adjacent to the object to be regarded are drawn.

8. A method of displaying an icon, comprising the steps of:
   drawing an icon indicating an object to be regarded; and
   drawing icons indicating objects having a correlation closest to a drawn icon indicating an object at an equal distance from the drawn icon indicating the object wherein:
      a correlation between objects is displayed by connecting icons indicating adjacent objects using a line.

9. The method according to claim 8 wherein:
   a form and a color of icons indicating the objects having the equal correlation are made different from forms and colors of icons indicating objects having different correlations so that the objects having the equal correlation can be easily identified.

10. The method according to claim 8 wherein:
    a drawing position of each icon can be automatically determined such that drawn icons or lines connecting icons do not overlap each other.

11. The method according to claim 8 wherein:
    detailed information about objects and an adjacency between the objects is displayed by selecting an icon indicating an object or a line connecting icons.

12. The method according to claim 8 wherein:
    a drawn icon indicating an optional object is selected to re-draw the selected object as a new object to be regarded.

13. The method according to claim 8 wherein:
    a drawn icon indicating an optional object is selected to change a drawing position of the icon indicating the selected object and a correlation with another icon, and a drawing position of an icon can be automatically amended such that possible overlap or intersection between icons and a line connecting the icons as a result of the change can be avoided.

14. The method according to claim 8 wherein:
    information about the object to be regarded and information about a correlation between the object to be regarded and an object adjacent to the object to be regarded are drawn.

15. A computer-readable storage medium used to direct a computer to perform the process of:
    drawing an icon indicating an object to be regarded;
    drawing icons indicating objects related to the object to be regarded and having an equivalent correlation at an equal distance from the icon indicating the object to be regarded; and
    connecting icons indicating adjacent objects using a line wherein:
       a correlation between the object to be regarded and a related object is indicated on circumferences of concentric circles.

16. The medium according to claim 15 wherein:
    a form and a color of icons indicating the objects having the equal correlation are made different from forms and colors of icons indicating objects having different correlations so that the objects having the equal correlation can be easily identified.

17. The medium according to claim 15 wherein:
    a drawing position of each icon can be automatically determined such that drawn icons or lines connecting icons do not overlap each other.

18. The medium according to claim 15 wherein:
    detailed information about objects and an adjacency between the objects is displayed by selecting an icon indicating an object or a line connecting icons.

19. The medium according to claim 15 wherein:
    a drawn icon indicating an optional object is selected to re-draw the selected object as a new object to be regarded.

20. The medium according to claim 15 wherein:
    a drawn icon indicating an optional object is selected to change a drawing position of the icon indicating the selected object and a correlation with another icon, and a drawing position of an icon can be automatically amended such that possible overlap or intersection between icons and a line connecting the icons as a result of the change can be avoided.

21. The medium according to claim 15 wherein:
    information about the object to be regarded and information about a correlation between the object to be regarded and an object adjacent to the object to be regarded are drawn.

22. A computer-readable storage medium used to direct a computer to perform the process of:

drawing an icon indicating an object to be regarded;

drawing icons indicating objects having a correlation closest to a drawn icon indicating an object at an equal distance from the drawn icon indicating the object wherein:

a correlation between objects is displayed by connecting icons indicating adjacent objects using a line.

23. The medium according to claim 22 wherein:

a form and a color of icons indicating the objects having the equal correlation are made different from forms and colors of icons indicating objects having different correlations so that the objects having the equal correlation can be easily identified.

24. The medium according to claim 22 wherein:

a drawing position of each icon can be automatically determined such that drawn icons or lines connecting icons do not overlap each other.

25. The medium according to claim 22 wherein:

detailed information about objects and an adjacency between the objects is displayed by selecting an icon indicating an object or a line connecting icons.

26. The medium according to claim 22 wherein:

a drawn icon indicating an optional object is selected to re-draw the selected object as a new object to be regarded.

27. The medium according to claim 22 wherein:

a drawn icon indicating an optional object is selected to change a drawing position of the icon indicating the selected object and a correlation with another icon, and a drawing position of an icon can be automatically amended such that possible overlap or intersection between icons and a line connecting the icons as a result of the change can be avoided.

28. The medium according to claim 22 wherein:

information about the object to be regarded and information about a correlation between the object to be regarded and an object adjacent to the object to be regarded are drawn.

29. An icon display apparatus for drawing an icon corresponding to an object in consideration of a correlation between objects, comprising:

computation means for determining a drawing position of an icon indicating an object to be regarded, and computing positions, at an equal distance from a position of the icon indicating the object to be regarded, of icons indicating objects having equivalent correlations with the object to be regarded as drawing positions of the icons indicating the objects related with the object to be regarded; and drawing means for drawing the icon indicating the object to be regarded, drawing an icon indicating an object related to the object to be regarded at a position obtained by said computation means, and connecting icons indicating adjacent objects through a line wherein:

a correlation between the object to be regarded and a related object is indicated on circumferences of concentric circles.

30. The apparatus according to claim 29 wherein:

a form and a color of icons indicating the objects having the equal correlation are made different from forms and colors of icons indicating objects having different correlations so that the objects having the equal correlation can be easily identified.

31. The apparatus according to claim 29 wherein:

a drawing position of each icon can be automatically determined such that drawn icons or lines connecting icons do not overlap each other.

32. The apparatus according to claim 29, wherein:

detailed information about objects and an adjacency between the objects is displayed by selecting an icon indicating an object or a line connecting icons.

33. The apparatus according to claim 29 wherein:

a drawn icon indicating an optional object is selected to re-draw the selected object as a new object to be regarded.

34. The apparatus according to claim 29 wherein:

a drawn icon indicating an optional object is selected to change a drawing position of the icon indicating the selected object and a correlation with another icon, and a drawing position of an icon can be automatically amended such that possible overlap or intersection between icons and a line connecting the icons as a result of the change can be avoided.

35. The apparatus according to claim 29, wherein:

information about the object to be regarded and information about a correlation between the object to be regarded and an object adjacent to the object to be regarded are drawn.

36. An icon display apparatus for drawing an icon corresponding to an object in consideration of a correlation between objects, comprising:

computation means for determining a drawing position of an icon indicating an object to be regarded, and computing positions, at an equal distance from a position of a drawn icon indicating the object, of icons indicating objects having a correlation closest to the object whose drawing position has been determined as a drawing position of an icon indicating an object having the correlation closest to the object whose drawing position has been determined; and drawing means for drawing an icon indicating the object to be regarded and an icon indicating another object, and connecting icons indicating adjacent objects through a line.

37. The apparatus according to claim 36 wherein:

a form and a color of icons indicating the objects having the equal correlation are made different from forms and colors of icons indicating objects having different correlations so that the objects having an equal correlation can be easily identified.

38. The apparatus according to claim 36 wherein:

a drawing position of each icon can be automatically determined such that drawn icons or lines connecting icons do not overlap each other.

39. The apparatus according to claim 36, wherein:

detailed information about objects and an adjacency between the objects is displayed by selecting an icon indicating an object or a line connecting icons.

40. The apparatus according to claim 36 wherein:

a drawn icon indicating an optional object is selected to re-draw the selected object as a new object to be regarded.

41. The apparatus according to claim 36 wherein:

a drawn icon indicating an optional object is selected to change a drawing position of the icon indicating the selected object and a correlation with another icon, and a drawing position of an icon can be automatically amended such that possible overlap or intersection between icons and a line connecting the icons as a result of the change can be avoided.

42. The apparatus according to claim 36, wherein:

information about the object to be regarded and information about a correlation between the object to be regarded and an object adjacent to the object to be regarded are drawn.

* * * * *

UNITED STATES PATENT AND TRADEMARK OFFICE
CERTIFICATE OF CORRECTION

PATENT NO. : 6,219,053 B1
DATED : April 17, 2001
INVENTOR(S) : Shoichi Tachibana et al.

It is certified that error appears in the above-identified patent and that said Letters Patent is hereby corrected as shown below:

Title page,
Item [54], add -- DEVICE -- after "DISPLAY".

Signed and Sealed this

Eleventh Day of December, 2001

*Attest:*

NICHOLAS P. GODICI
*Attesting Officer*    *Acting Director of the United States Patent and Trademark Office*